United States Patent [19]
Sisbarro et al.

[11] Patent Number: 6,164,122
[45] Date of Patent: Dec. 26, 2000

[54] SYSTEM AND METHOD INCLUDING MULTIPLE TEST CHAMBERS FOR AUTOMATED TESTING FOR HOLES IN PROPHYLACTIC DEVICE

[75] Inventors: Frederick P. Sisbarro, Wayne; Glenn W. Thomsen, Cream Ridge, both of N.J.

[73] Assignee: Carter-Wallace, Inc., New York, N.Y.

[21] Appl. No.: 09/295,551

[22] Filed: Apr. 21, 1999

[51] Int. Cl.[7] .................................................. G01M 3/00
[52] U.S. Cl. .................. 73/45; 73/40; 73/45.1; 73/45.2; 73/45.3; 73/49.2; 417/755
[58] Field of Search .................. 73/40, 41, 45, 73/45.1, 45.2, 45.3, 45.4, 49.2, 37, 38; 414/755

[56] References Cited

U.S. PATENT DOCUMENTS

| | | | |
|---|---|---|---|
| 2,162,209 | 6/1939 | Trutner | 176/2 |
| 2,293,290 | 8/1942 | Gammeter | 214/1 |
| 2,385,491 | 9/1945 | Blair | 73/41 |
| 3,389,811 | 6/1968 | Frank | 214/6.5 |
| 3,588,997 | 6/1971 | Field | 29/450 |
| 3,785,195 | 1/1974 | Yasuhiro et al. | 73/37 |
| 3,815,248 | 6/1974 | Kulig | 33/174 L |
| 3,824,840 | 7/1974 | Amberg | 73/45.3 |
| 3,874,226 | 4/1975 | Weber | 73/45.2 |
| 3,992,766 | 11/1976 | Field | 29/235 |
| 4,099,404 | 7/1978 | Eberle | 73/45.2 |
| 4,144,742 | 3/1979 | Schmidt et al. | 73/37 |
| 4,637,249 | 1/1987 | Ishizaki et al. | 73/41 |
| 4,683,745 | 8/1987 | Broughman, Jr. et al. | 73/49.2 |
| 5,097,697 | 3/1992 | Carnal et al. | 73/40 |
| 5,129,256 | 7/1992 | McGlothlin | 73/40 |
| 5,138,871 | 8/1992 | Retta et al. | 73/38 |
| 5,163,313 | 11/1992 | Haas, Jr. et al. | 73/41 |
| 5,199,296 | 4/1993 | Lehmann | 73/49.3 |
| 5,255,558 | 10/1993 | Hamilton | 73/40 |
| 5,327,775 | 7/1994 | Epshetsky | 73/40 |
| 5,422,240 | 6/1995 | Lytle et al. | 435/5 |
| 5,438,861 | 8/1995 | Sisbarro et al. | 73/40 |
| 5,499,898 | 3/1996 | Vonier et al. | 414/755 |
| 5,517,849 | 5/1996 | Sisbarro et al. | 73/40 |
| 5,524,478 | 6/1996 | Joy et al. | 73/40 |
| 5,824,882 | 10/1998 | Griebel et al. | 73/38 |
| 6,038,915 | 3/2000 | O'Herron et al. | 73/49.3 |
| 6,044,693 | 4/2000 | Sisbarro et al. | 73/41 |

FOREIGN PATENT DOCUMENTS

| | | |
|---|---|---|
| 2 700 390 | 7/1994 | France . |
| 2700390 | 7/1994 | France . |

*Primary Examiner*—Hezron Williams
*Assistant Examiner*—Charles D. Garber
*Attorney, Agent, or Firm*—Kenneth Watov; Watov & Kipnes, P.C.

[57] ABSTRACT

A plurality of test chambers or fixtures are operable for successively testing a plurality of condoms, respectively, in an automated manner. Each test chamber for testing a condom includes a housing containing a porous liner having an interior cavity conformed to the exterior shape of a condom to be tested, whereby a holder carrying the condom is inserted into the liner, a closed pathway for gas flow is provided between a gas port of the holder and the interior volume of the condom, for permitting the condom to be inflated with the gas, causing the exterior walls of the condom to be pushed against opposing inside walls of the liner, permitting gas passing through holes in the condom to flow through pores in walls of the liner to another gas port of the housing for detecting unacceptable holes in the condom using differential pressure techniques and/or gas tagging.

18 Claims, 19 Drawing Sheets

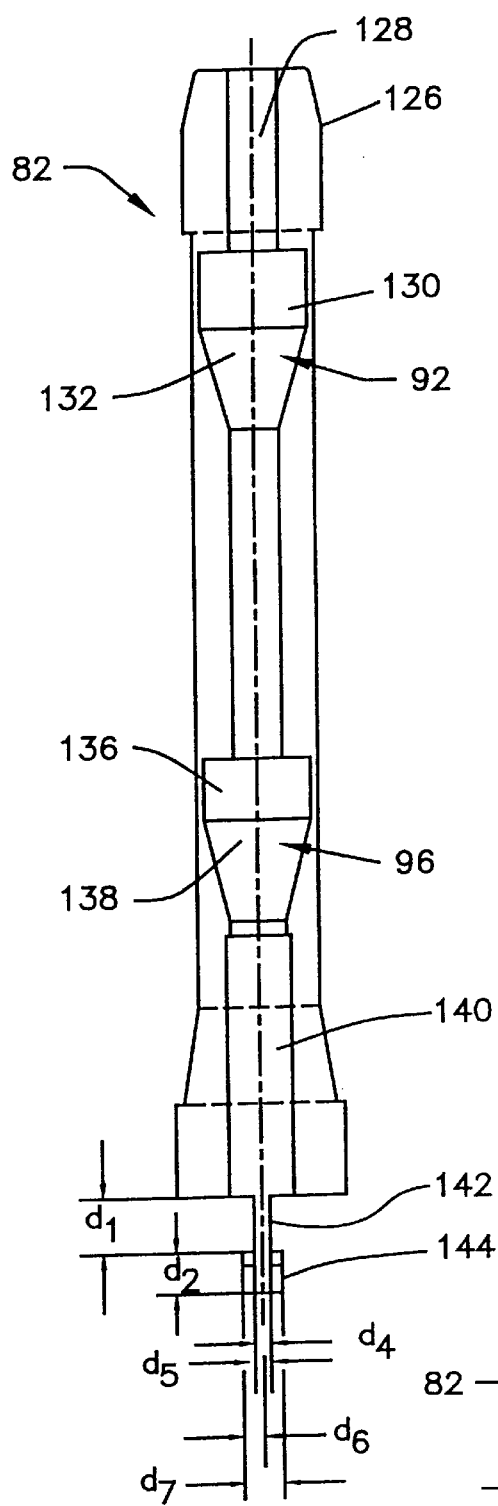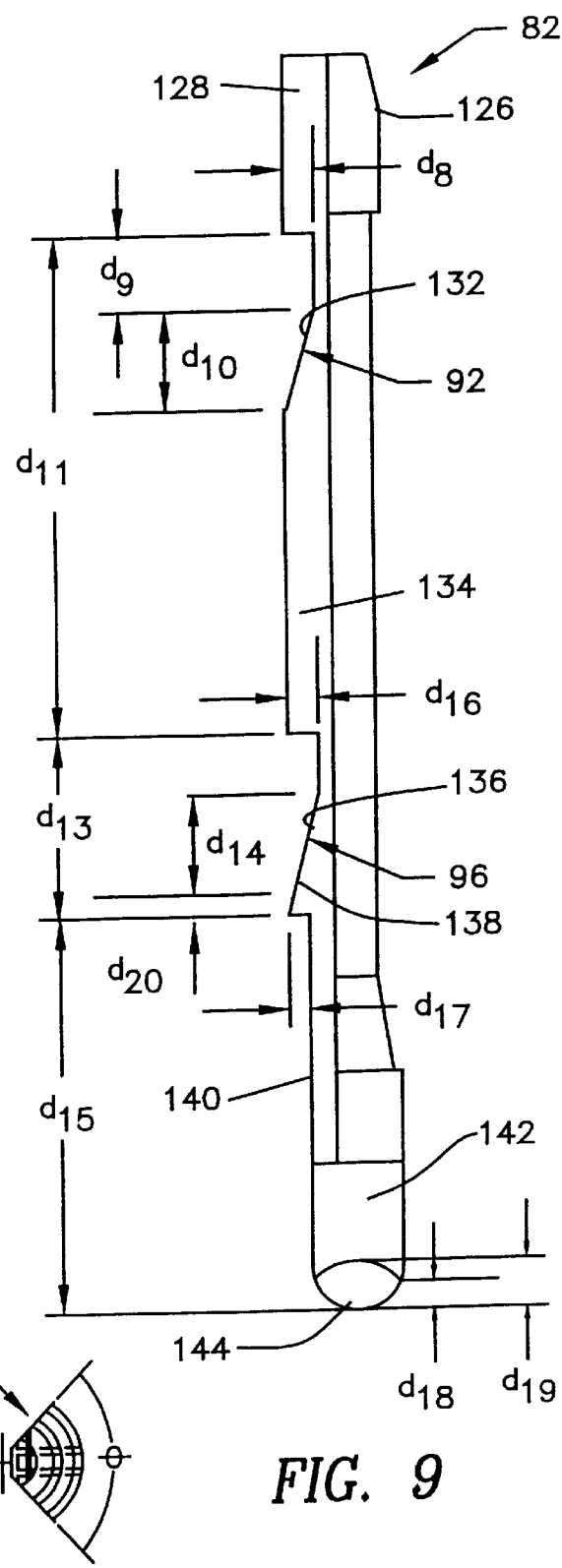
FIG. 8
FIG. 10
FIG. 9

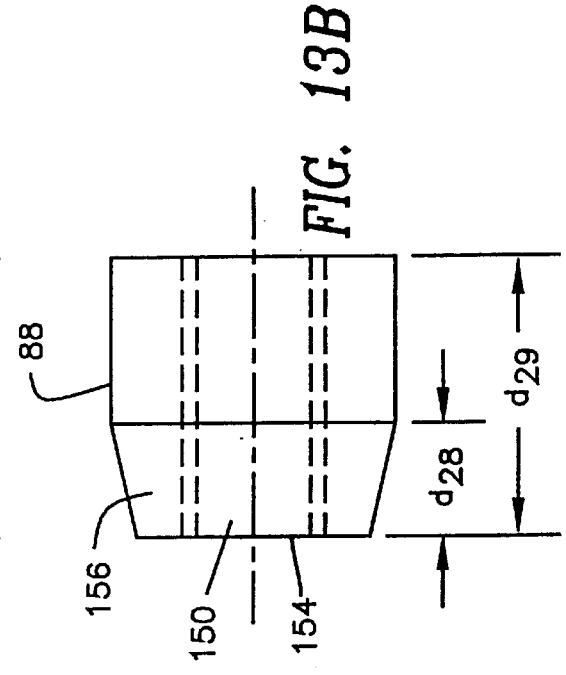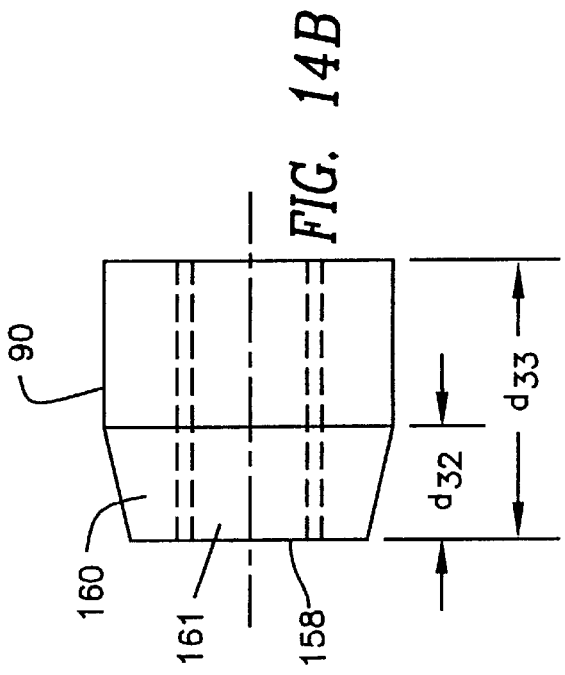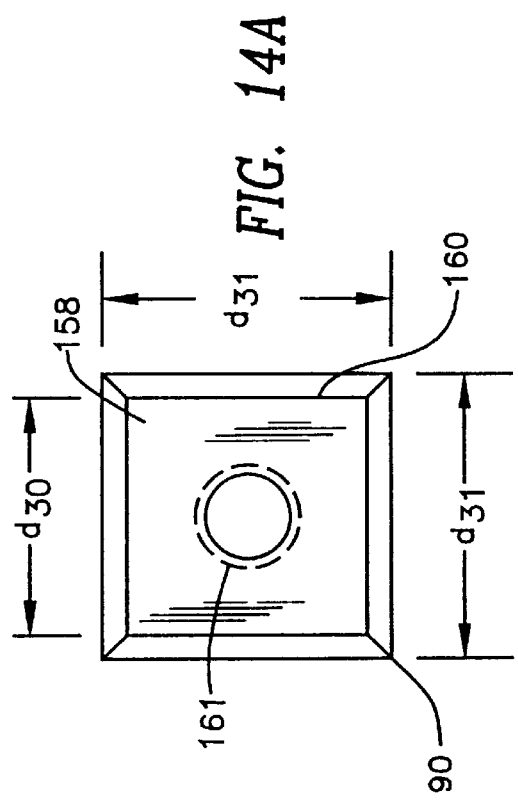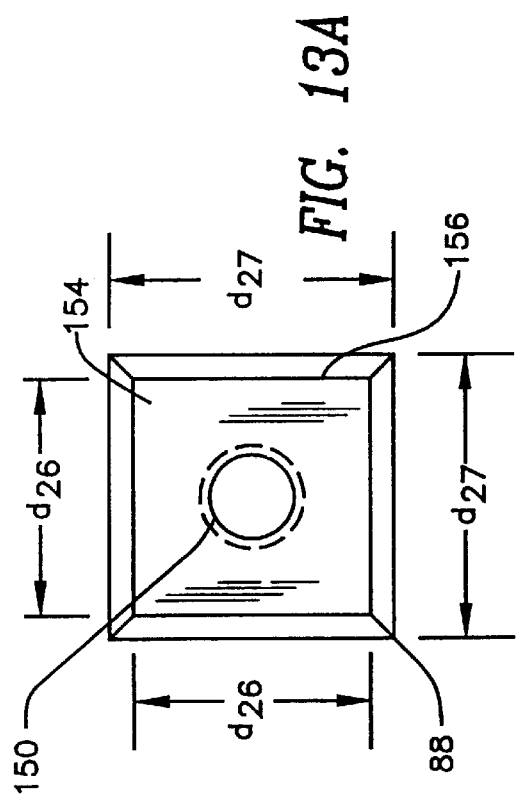

SYSTEM AND METHOD INCLUDING MULTIPLE TEST CHAMBERS FOR AUTOMATED TESTING FOR HOLES IN PROPHYLACTIC DEVICE

FIELD OF THE INVENTION

This invention is in the field of testing the integrity of prophylactic devices, including condoms, gloves, and other thin walled devices of elastic material, for example.

RELATED INVENTION

This invention is related to the invention of U.S. Pat. No. 5,438,861, issued Aug. 8, 1995, for "Apparatus and Method for Testing for Holes in A Prophylactic Device", and U.S. Pat. No. 5,517,849, issued May 21, 1996, for "Apparatus and Method Including Porous Liner for Testing for Holes in Prophylactic Devices", each having a common assignee. The teachings of the two related patents are incorporated herein by reference to the extent they do not conflict herewith.

BACKGROUND OF THE INVENTION

Whereas the reliability of prophylactic devices such as condoms has always been important, the prevalence of AIDS and the alarming increase in unwanted pregnancies has placed even greater emphasis on detecting holes through which body fluids may pass. At the same time, it is important that the testing for holes be done as economically as possible. Ideally, no defective condoms should pass a test for holes and no acceptable condoms should fail it. It is the understanding of the inventors that the FDA requires testing for holes as small as 10 microns.

A number of testing methods are available. They include a water leak test in which the condom is filled with water and an operator visually checks its outer surface for water droplets. Small holes in the condom result in extremely small water droplets on the surface. These droplets are difficult to see even if the hole location is known before the test is performed. Under actual operating conditions, the failure to detect such a small water droplet could result in the acceptance of a defective condom. Unless extreme care is used, water droplets can be inadvertently deposited on the condom so that acceptable condoms are rejected. Furthermore, it is difficult for an operator to continue to keep a sharp eye out for the droplets. In addition to these difficulties, the inspection of a condom for droplets takes a long time.

Holes can also be detected by electrical methods. In a "wet test", a condom is stretched over a mandrel of conductive material and immersed in a conductive aqueous solution. A low voltage is applied between the mandrel and the solution so that the flow of current in the circuit thus formed indicates a hole. In a "dry test" method, the condom is stretched over a conductive mandrel and conductive brushes or a fine steel screen is placed in contact with the outer surface of the condom. Voltage is applied between the mandrel and the brush or screen so as to produce a current if there is a hole in the condom. But such methods do not work well for condoms made of certain non-latex material, such as polyurethane, for example.

U.S. Pat. No. 5,129,256 describes a method and apparatus for testing condoms by mounting them on a hollow porous mandrel, drawing a partial vacuum in the space within the mandrel and monitoring the interior of the porous mandrel for gas flowing through its walls with a vacuum pressure transducer. It is indicated that preferably the mandrel have an outside diameter that is less than the inside diameter of a condom. The pore openings in the wall are distributed substantially uniformly over its external surface and preferably have a median diameter ranging from ten to fifty microns with a preferred median diameter of twenty microns. The porous part of the mandrel is comprised of a cylindrical body that is closed off at one end, has a wall thickness between 0.04 to 0.50 of an inch and a void volume between 35% and 60%.

If the mandrel is made by sintering particles, fine pores are desired because the dimensions of the walls between pores at the surface of the mandrel are smaller and thus less likely to block a hole in a condom that is stretched over it.

In an invention set forth and claimed in U.S. Pat. No. 5,517,849, a condom or other prophylactic device is tested by mounting it within an hollow central portion of a testing device having a porous liner of a preferably corresponding shape and establishing a differential in pressure between the inside of the condom and the space outside of the porous liner. The differential can be obtained by increasing the pressure in the space inside the condom while the space outside the porous liner is at a predetermined pressure such as atmospheric pressure or by creating a partial vacuum outside the porous liner while the space inside the condom is at atmospheric pressure. The differential in pressure is established during a first period, in which the condom is inflated. The pressure within the condom is allowed to stabilize during a second period, and the rate of change of the pressure differential between the interior of the condom and outside the porous liner is tested within a third period, for determining if it exceeds a given value so as to indicate the presence of a leak through a hole in the condom. During the second and third periods, in one embodiment of the invention, gas passing through a hole in the condom increases the pressure within a confined region about the porous liner so as to provide an integrated effect, if the interior has a higher pressure or if the confined space outside the porous liner and condom is at a lower pressure than interior to the porous liner. Pressures are tested at the beginning and end of the third period, and the change during each test is compared to previously determined calibration limits to determine the acceptability of the condom.

In accordance with an aspect of the invention of the aforesaid Patent, the determination made during the third period referred to above as to whether the pressure in the confined space or region outside the porous liner and condom is increasing rapidly enough to indicate a leak is made by comparing it with a standard pressure. If it is greater than a predetermined value, a leak is present, but if it is not greater there is no leak. This is a more accurate method than making an absolute measurement of the pressure external to the condom with a transducer.

As previously noted, from a theoretical viewpoint, the smaller the pores at the surface of the porous liner, the smaller the holes that can be detected in a condom. In accordance with an important aspect of this invention, the size of pores in the portion of the porous liner that will be adjacent the body portion of a condom during a test is small enough to detect holes of an acceptable minimum size at any point in the condom.

SUMMARY OF THE INVENTION

In accordance with this invention, a machine is provided for expeditiously testing prophylactic means with testing devices described in the aforesaid Pat. No. 5,517,849. In a preferred embodiment, a plurality of the testing devices are carried around a closed path. At least one point in the path, the condoms to be tested are successively placed on an individual condom holder when the holder is withdrawn from its associated porous liner. At a later point a cam mechanism inserts the holder into the associated porous liner so that testing can take place in a testing portion of the path under the control of a microprocessor. Testing is performed by establishing a pressure differential between the inside and outside of a condom and detecting changes in it. After the testing is completed, the condom holder with a condom mounted thereon is withdrawn from the porous liner by another cam mechanism. Defective condoms are removed and deposited in one collector, and condoms that have passed the test are removed and deposited in another collector. Another condom can then be mounted on the condom holder and the testing process repeated. In one embodiment of the invention there are two positions along the path at which condoms are successively placed on individual condom holders, and each position is followed by cam mechanisms on either side of a testing portion of the path, one for inserting a condom holder into its associated porous liner, and the other for withdrawing the condom holder from the porous liner.

Two condom holders are described in the aforesaid U.S. Pat. No. 5,517,849. In one of them the condom is stretched taught as it is drawn down on a non expandable mandrel, and removal of both defective and acceptable condom is accomplished by moving a rotary brush from the open end of the condom to its closed end. The other condom holder is provided with fingers that are surrounded by an elastomer sheath having a sleeve-like configuration. A condom is drawn down over the sheath when the fingers are retracted, and the fingers remain retracted during testing. By expanding the fingers after testing, a condom that has passed the test can be rolled up and deposited in a collector, but the fingers remain retracted in the case of a condom that has failed the test, so that it can be removed from the condom holder by a blast of air blowing it into a vacuum tube that transports the defective condom and deposits it into a collector. The rolling of acceptable condoms may be effected by a rotary brush, or by other means.

BRIEF DESCRIPTION OF THE DRAWINGS

Various embodiments of the present invention are described below with reference to the drawings, wherein similar items are identified by the same reference designation, in which:

FIG. 8 is a front elevational view of a finger of the expandable condom holder of FIG. 2;

FIG. 9 is a side elevational view of the finger of FIG. 8;

FIG. 10 is a top view of the finger of FIG. 9;

FIG. 13A is a front elevational view of a first cam section of the cam rod subassembly of FIG. 11;

FIG. 13B is a side elevational view of the first cam section of FIG. 13A;

FIG. 14A is a front elevational view of a second cam section of the cam rod subassembly of FIG. 11;

FIG. 14B is a side elevational view of the cam section of FIG. 14A;

DETAILED DESCRIPTION OF THE INVENTION

Figure 1:
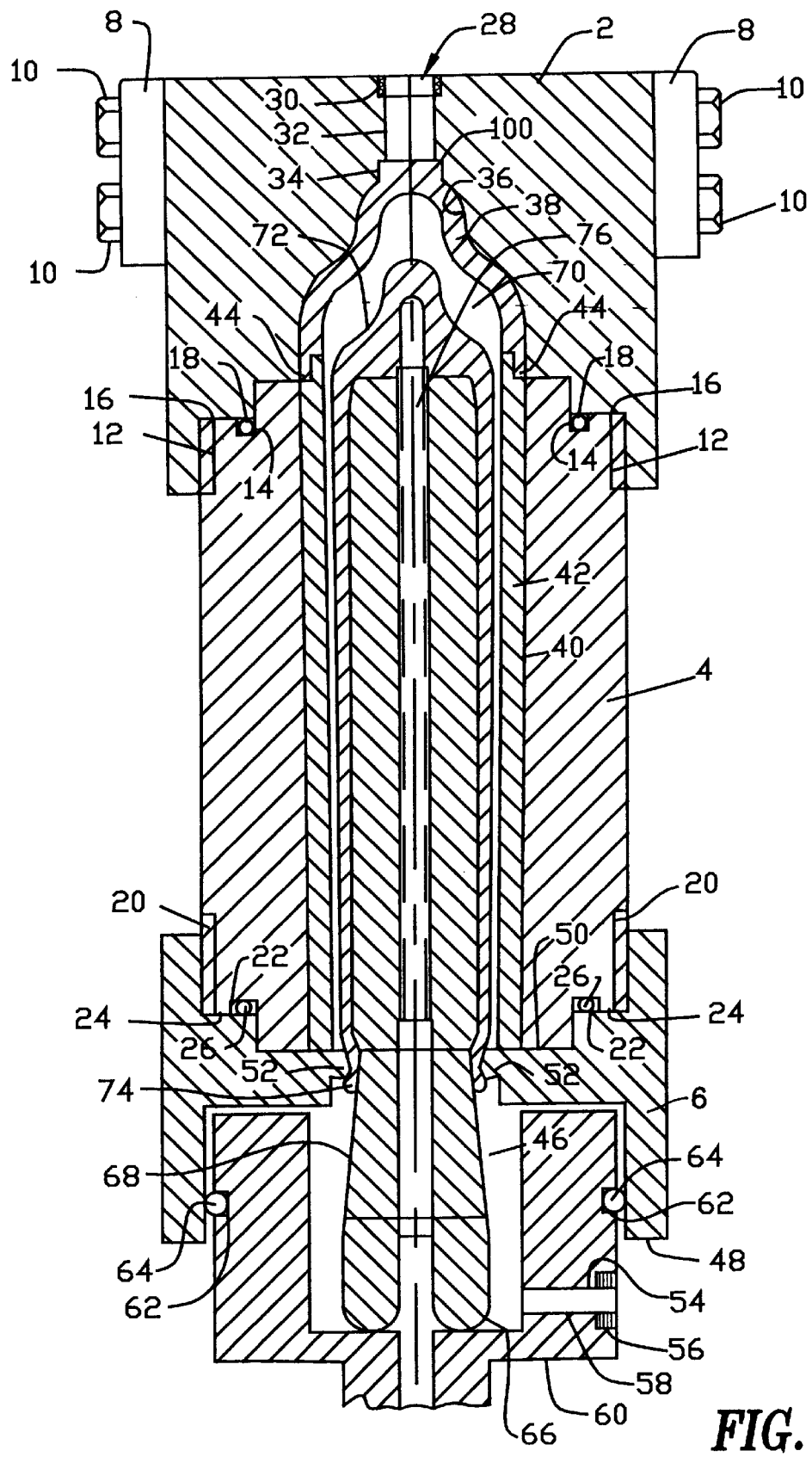
FIG. 1 is a cross-sectional diagram of a testing device having a non-expandable condom holder.

Immediately following are descriptions of the testing devices having non-expandable and expandable condom holders, respectively, that are disclosed in the U.S. Pat. No. 5,517,849. The description of these devices are repeated here for convenience. As shown in FIG. 1, a testing device having a non expandable condom holder is comprised of a housing of appropriate material, such as stainless steel or aluminum, for example, consisting of three sections; namely, a top housing section 2, an intermediate housing section 4, and a bottom housing section 6. A bracket 8 is secured to the top housing section 2 via bolts 10, and although not shown in FIG. 1, the other end of the bracket 8 is rigidly secured to a portion of a slide mechanism to be discussed below. In other embodiments the bracket 8 can be secured to intermediate housing 4 or bottom housing 6. The intermediate housing section 4 screws into the top housing section 2 via inter-cooperating threaded portions 12 therebetween. A channel 14 is provided in a stepped-down shoulder portion 16 of intermediate housing section 4, for retaining an O-ring 18, for providing an airtight seal between the top housing section 2 and intermediate housing section 4. Similarly, a bottom portion of the intermediate housing section 4 is screwed into a top portion of the bottom housing section 6 via cooperative threads 20, as shown. A channel 22 is formed about the inter-circumference of a stepped-down shoulder portion 24, relative to the bottom of intermediate housing section 4, for retaining an O-ring 26. The O-ring 26 provides an airtight seal between the bottom of the intermediate housing section 4 and bottom housing section 6. Note that the housing formed by sections 2, 4, and 6, as described, can be oriented in any desired manner, whereby for the sake of convenience, sections 2, 4, and 6 have been herein identified as top, intermediate, and bottom sections, respectively. Accordingly, such illustrative identification means is not meant to be limiting. Also, in this example, the housing sections 2, 4, and 6 are generally cylindrical in shape, which although preferred can have any other desired and practical shape.

The top housing section 2 includes a topmost and centralized air port 28 including a threaded upper portion 30 for receiving a mating threaded male portion of a connector for an air line or conduit (not shown). In this example, the intermediate portion of the air port 28 includes an air passageway 32 that terminates into a shallow air chamber 34 of increased diameter relative to the intermediate passage way 32. The shallow air chamber 34, in turn opens into a generally bell shape cavity 36 for receiving the top section 38 of a porous liner, discussed in greater detail below. Note also that the shallow air chamber 34 receives a central hub portion 100 of the top section 38 of a porous liner.

The intermediate housing section 4 further comprises a centrally located cylindrical cavity or chamber 40 for retaining a bottom section 42 of the previously mentioned porous liner. As shown, the shapes of the bottom portion of the top section 38, and top portion of the bottom section 42, respectively, of the porous liner are configured for joining together via inner wall portions, while leaving a relatively narrow exterior gap or radial groove 44 therebetween. As will be shown in greater detail below, the groove 44 avoids having to align longitudinal grooves in and between the top and bottom porous liner sections 38, 42, respectively (see FIGS. 3, 5, 6, and 7).

The bottom housing section 6 includes a centrally located cylindrical cavity 46, in this example, extending from the bottom portion 48 thereof, towards a stepped-down or reduced diameter top portion 50, but terminating below this top portion 50, where between a metal seal ring 52 is formed in the uppermost portion of the cavity 46 proximate an opening through the top surface 50. Alternatively, the seal ring 52 can be a separate plastic, rubber, or metal insert.

In the embodiment of FIG. 1, a movable platform 60 is shown positioned proximate the bottom surface 48 of the bottom housing section 6. The platform 60 includes a circular groove or channel 62, in this example, for retaining an O-ring 64, to provide an airtight seal with the bottom 48 of bottom housing section 6, whenever platform 60 is positioned as shown for compressing the O-ring 64 therebetween. Other sealing methods will be obvious to those skilled in the art. A horizontally oriented air port 54 includes a threaded entry portion 56 for receiving a mating connector of an air line (not shown), and an air passageway 58 opening into a cavity 66, as shown. The movable platform 60 is also shown to be carrying partially within the recessed centrally located cavity 66 a lower-most portion of a non expandable condom holder 68. Through such positioning of the movable platform 60, as shown, the major portion of the condom holder 68 is retained within the hollow cavity 70 formed within the top section 38 and bottom section 42 of the porous liner. The condom holder 68, in this example, is shown with a condom 72 positioned around its outside surface, with the bottom open end of the condom 72 being pressed between the metal seal ring 52 of the lower housing section 6 and the opposing opposite outside wall portion of the condom holder 68, thereby forming an airtight seal.

The condom holder 68, in this example, is non expandable and is formed to be substantially cylindrically shaped with a centrally located air passageway 76. The outside shape of the condom holder 68 is configured to support the condom 72 or other prophylactic device to be tested for leaks, during insertion into the test chamber, but the condom holder 68 is preferably of smaller diameter than the condom 72 to allow the condom 72 to slide easily onto it. However, in certain applications condom holder 68 may be of the same or greater diameter than the condom 72.

As will be shown in greater detail below, from a simplified standpoint, a condom positioned as shown in FIG. 1 is tested by injecting pressurized air into air port 54, wherefrom the air flows through cylindrical cavity 66 of the movable platform 60, around the bottom of the condom holder 68 via air passageways (not shown) leading into the central air passageway 76, and there through into the condom 72, for inflating the condom. Typically, the condom 72 is expanded from less than 12% to greater than 18%, with 12% to 18% being the typical range, during such inflation or pressurization, causing it to conform to the interior shape of porous liner 38, 42. In this example, the air pressure source 200 (see FIG. 16) provides air at a pressure up to 100 pounds per square inch, for example. The condom is tested at pressures ranging from less than 20 pounds per square inch to greater than 100 pounds per square inch, with 20 pounds to 100 pounds being the typical range. After the condom is inflated, the air port 28 is sealed off from the atmosphere, where after a sufficient period of time is provided for permitting the pressure to stabilize in the spaces between the porous liner sections 38 and 42, and the housing sections 2, 4, and 6, respectively. Thereafter, the rate of change of pressure increase within air port 28 is measured against a standard rate of change, for determining whether any leaks exist in the condom 72. If leaks do exist, air flows from inside the condom 72, which has expanded to be tightly forced against the interior walls of the porous liner sections 38 and 42, through opposing pores of the porous liner, and through open air paths provided in the exterior walls of the porous liner or the cylinder itself (to be described in detail below), into the air passageway 32, causing a change in pressure in air port 28. Note that for the example shown herein, grooves are provided for the air paths. The degree of pressure change measured within air port 28 determines whether a condom 72 is accepted or rejected, dependent upon the magnitude of the rate of pressure increase over predetermined periods of time in air passageway 32, as previously described.

After a condom 72 is so tested, the air ports 28 and 54 are vented to the atmosphere, causing the condom 72 to deflate back onto the condom holder 68. Thereafter, the movable platform 60 is lowered, or moved away from the housing sections 2, 4, and 6. When the condom holder 68 is so removed from the porous liner sections 38 and 42, and housing sections 2, 4, and 6, respectively, the condom 72 is removed from the condom holder 68 (typically by rolling it off holder 68), and is packaged for sale if accepted, or disposed of if rejected. Alternatively, to save time, rejected condoms 72 may be blown off of the condom holder 68 via means for injecting high pressure air into the air passageway 76 of condom holder 68. Note that in withdrawing the condom 72 on condom holder 68 from the porous liner sections 38 and 42, in certain applications it is preferred at such times to vent air port 54 to the atmosphere, while injecting slightly pressurized air into air port 28, to insure the condom 72 more easily and rapidly frees itself from the inside walls of the porous liner sections 38, 42, rather than sticking thereto. Note also, as shown in FIG. 1, that the condom bottom portion 74 near the opening of the condom 72 is typically configured as a circular rim of greater thickness than other portions of the condom 72. However, the operation, is not dependent upon a condom having such a feature. Also, the devices described are not meant to be limited to testing condoms, but can with modification be applied for testing many other prophylactic articles, such as rubber or synthetic gloves, sterile rubber finger tips, elastic tubes, and so forth.

Figure 2:
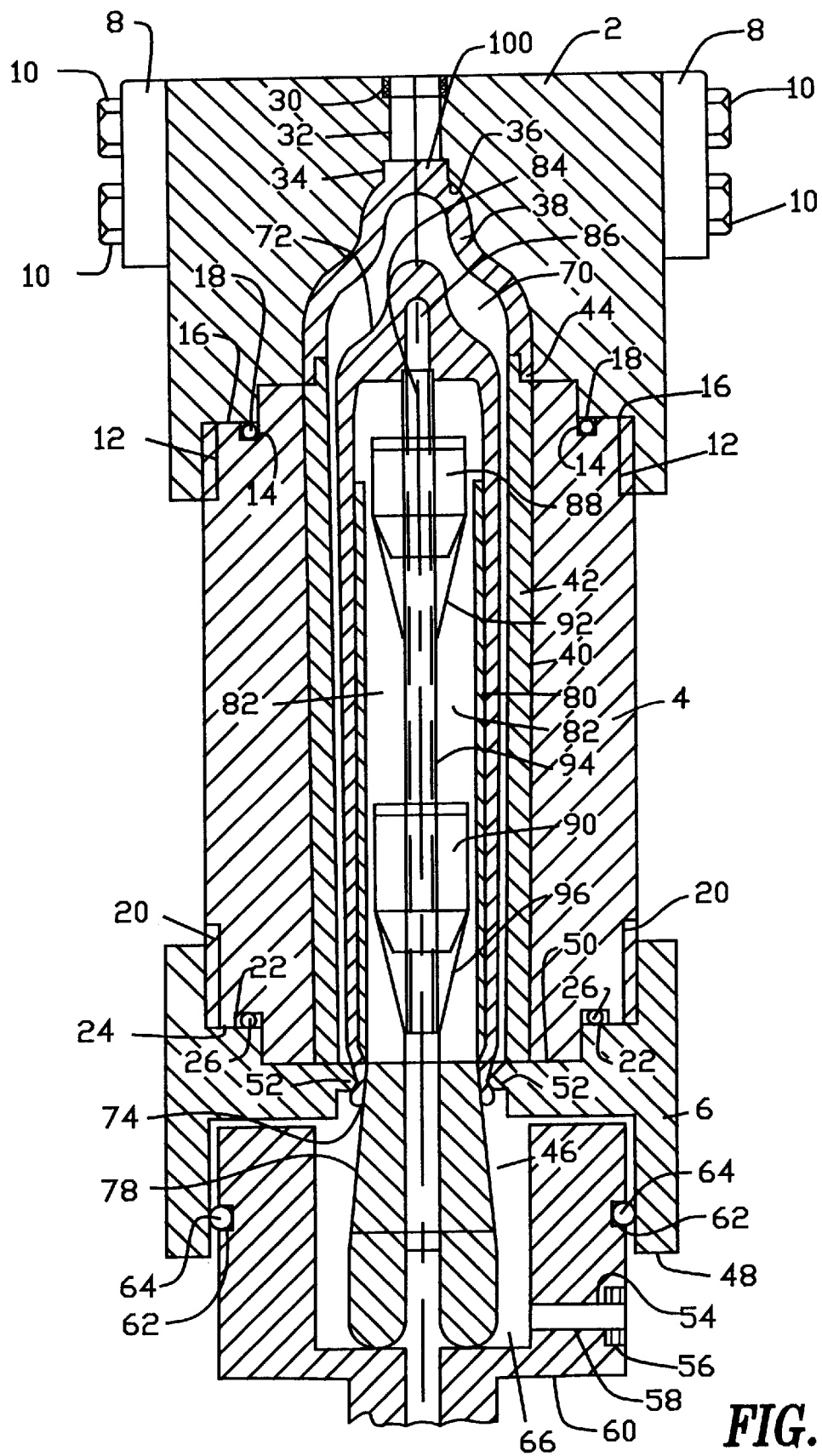
FIG. 2 is a cross-sectional view of a testing device having an expandable condom holder.

In FIG. 2, an expandable condom holder 78 is shown, rather than the non-expandable condom holder 68 of FIG. 1. Other portions of the apparatus shown in FIG. 2 are otherwise identical to that shown in FIG. 1. In this example, the expandable condom holder 78 comprises an elastomer sheath 80 in a sleeve-like configuration, for resiliently holding a plurality of expandable fingers 82 (only two are shown in FIG. 2, but four are used in this example) in position about a cam rod assembly 84 comprising a cam rod 86, a first cam section 88, and a second cam section 90, as shown. As will be described in greater detail below, the expandable fingers 82 each occupy one quadrant of the generally cylindrical expandable condom holder 78. In FIG. 2, the expanded condom holder 78 is shown in its retracted or non expanded state. This non expanded state is employed during testing of a condom 72, conducted generally as previously described for the embodiment of FIG. 1. However, in this preferred embodiment, air flows through the space provided between the outside wall of the cam rod 86 and the inside walls of the fingers 82, for inflating and deflating the condom 72 under test.

Figure 15:
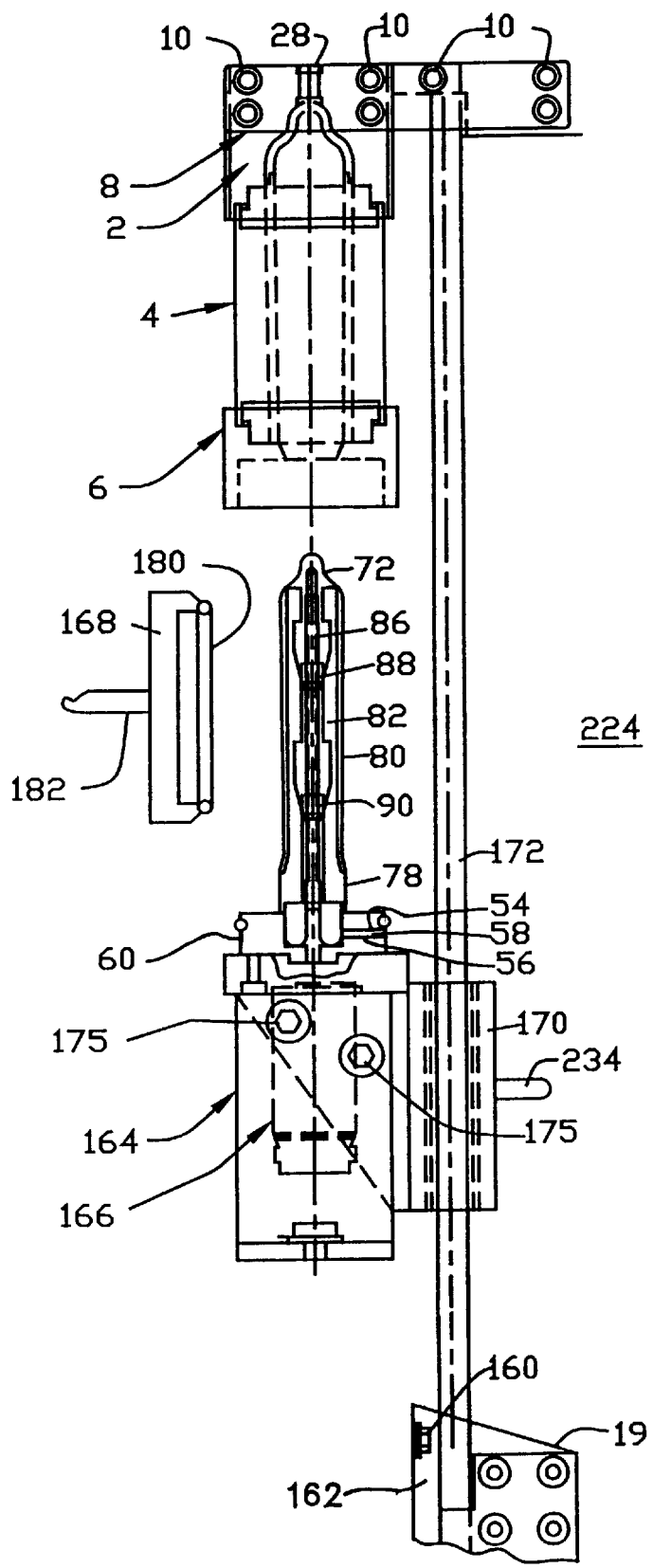
FIG. 15 is a pictorial view with partial cross-sectional portions of a slide mechanism for moving the condom holder into and out of engagement with the porous liner, a means for operating an expandable condom holder, and a mechanism for rolling up and removing condoms.

As shown in FIG. 15, after a condom 72 is tested, the movable platform 60 is moved away from the housing sections 2, 4, and 6, for freeing the expandable condom holder 78 from the porous liner sections 38, 42. After such withdrawal, the cam rod 86 is pulled in a direction, downward in this example, for causing the first and second cam sections 88 and 90, respectively, to engage first, second, and third inner cam surfaces 92, 94, and 96 of each expandable finger 82, (see FIG. 2), for spreading the fingers 82 apart against the tension of the elastomer sheath 80, to the extent necessary for holding the condom 72 tightly against the outside walls of the condom holder 78, to permit the condom 72 to be rolled off of the condom holder 78 more tightly. This cannot be readily accomplished if the condom 72 is loosely held upon the condom holder 78. Expanding the condom holder 78 for insuring that the condom 72 is slightly stretched over the condom holder 78, permits it to be readily rolled off. The mechanisms for accomplishing this will be described in greater detail below in relation to FIG. 15.

Figure 3:
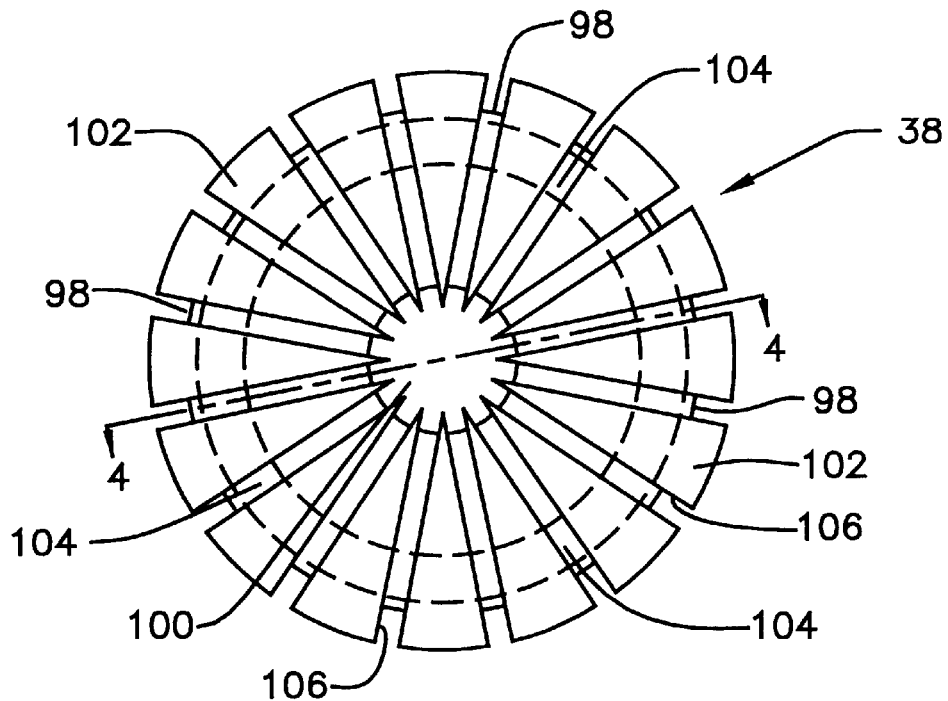
FIG. 3 is a top view of the top section of a porous liner.
Figure 5:
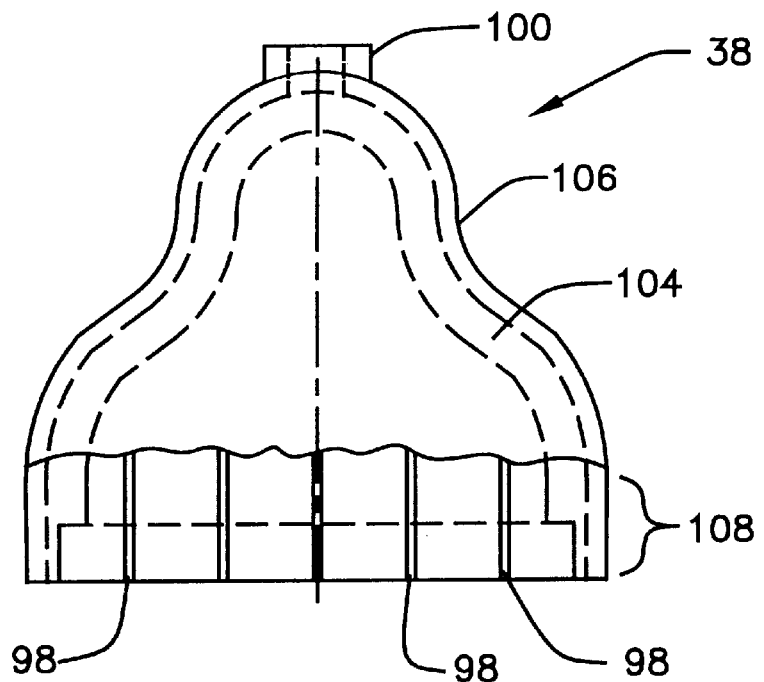
FIG. 5 is a partial side elevational view of the top section of the porous liner of FIG. 3.

In FIG. 3, a top view of the top section 38 of the porous liner is shown. A plurality of grooves or air channels 98 are formed in the top section, as shown. In the uppermost portion of the top section 38 of the porous liner, the grooves 98 are spaced apart and regularly directed from a topmost and centrally located hub section 100. The grooves 98 in the topmost portion are formed between triangular sections 102. With further reference to FIG. 3, and also with reference to the partial pictorial of porous liner section 38 of FIG. 5, and areas where the grooves 98 exist, the thickness of the top porous liner section 38 is equivalent to the thickness of wall section 104. In wall areas where the grooves 98 are not formed, the thickness of the walls is increased by the thickness of the wall segment shown as 106. Also as shown, the grooves 98 extend from the central hub 100, through the upper bell-shaped portion of porous liner section 38, and through the parallel and opposing sidewall portions 108.

Figure 4:
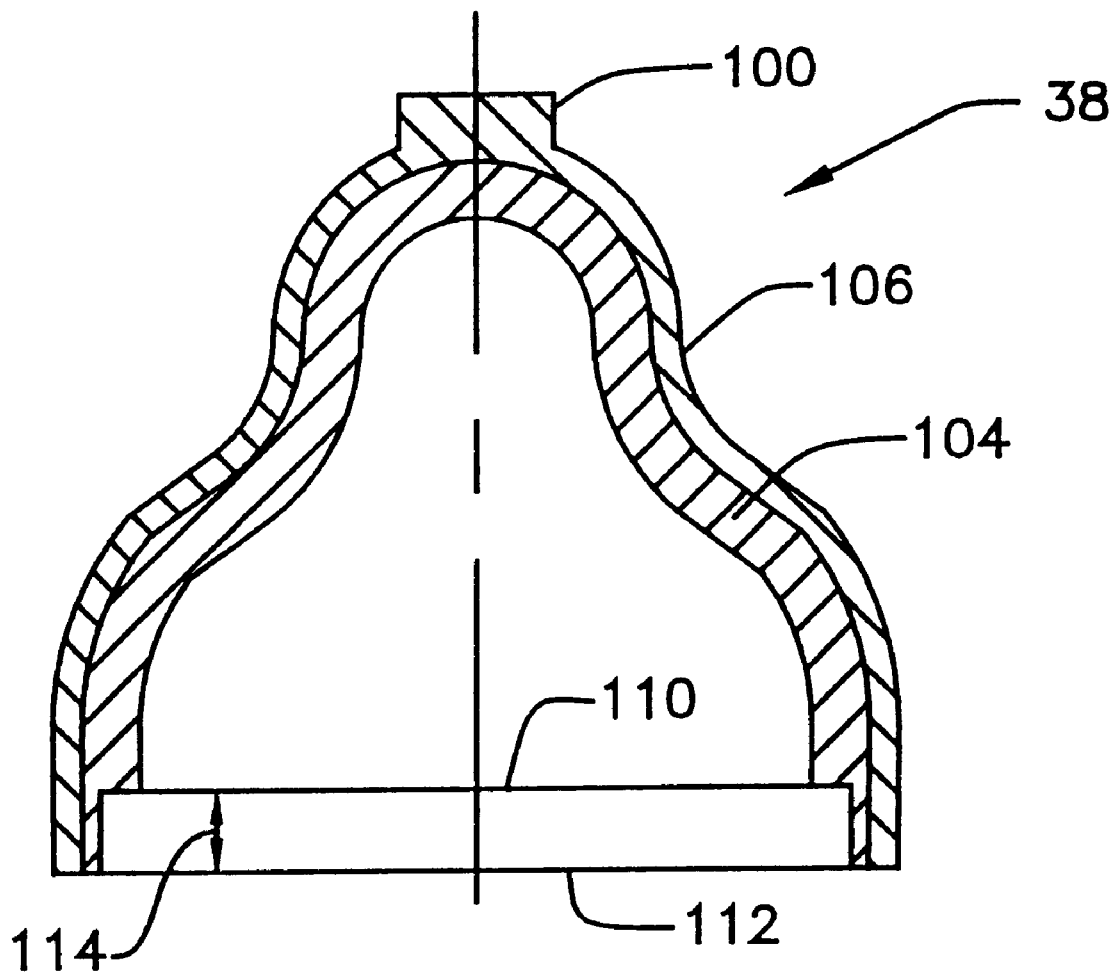
FIG. 4 is a longitudinal cross-sectional view of the top section of the porous liner of FIG. 3.

With reference to FIG. 4, a cross sectional view of the top section 38 of the porous liner of FIG. 3 is shown. Note that at the bottom of the section 38, a band-like bottom most portion of the wall portion 104 is cut out. As a result, the bottom 110 of the inner wall portion of wall portion 104 is shorter than and separated by a predetermined distance (see arrow 114) from the bottom 112 of the outer wall portion 106. The predetermined distance 114 between the bottoms 110 and 112 of wall sections 104 and 106, respectively, is dimensioned to provide the gap or annular groove 44 shown in FIGS. 1 and 2, as will be described in greater detail below.

Figure 6:
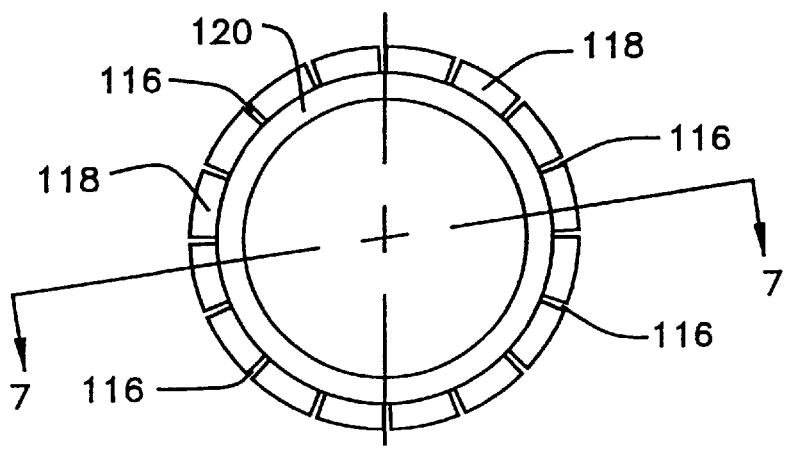
FIG. 6 is a top view of the bottom section of the porous liner.
Figure 7:
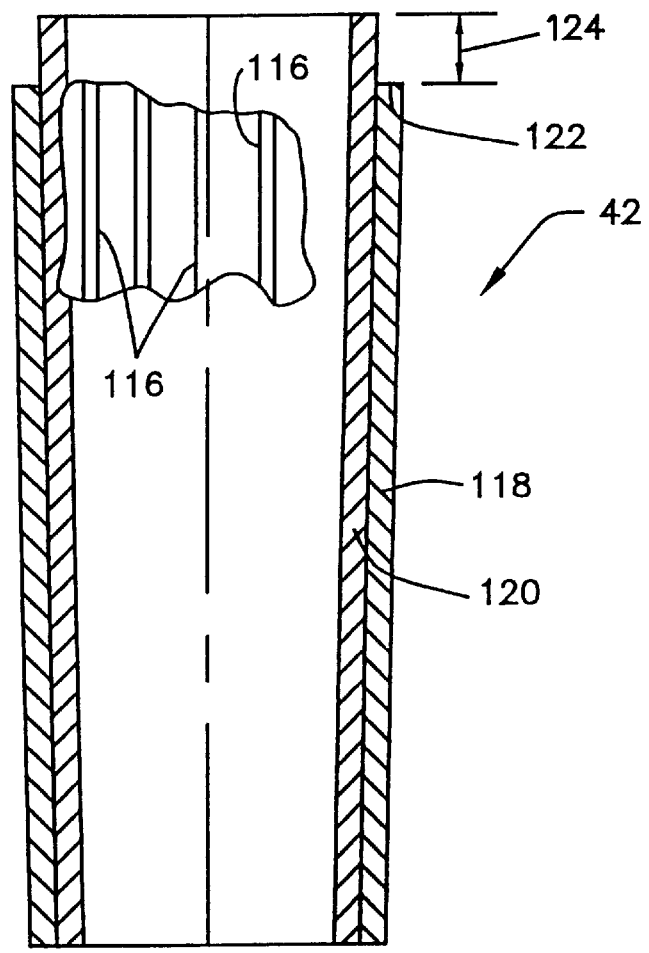
FIG. 7 is a longitudinal cross-sectional view of the bottom section of the porous liner of FIG. 6.

A top view, and a side elevational view, are shown in FIGS. 6 and 7, respectively, for the bottom section 42 of the porous liner, in this example. As shown, grooves or air channels 116 are formed or partially cut into the outside side wall portions 118, extending to an interior side wall portion 120, as shown. As further shown in FIG. 7, the interior side wall portion 120 extends beyond the top shoulder 122 of the outside side wall 118, by a predetermined distance indicated by arrow 124. Note that this predetermined distance 124 is made sufficiently greater that the predetermined distance 114, previously described for the extension of the outside wall segment 106 beyond the interior wall segment 104 of the top section 38 of the porous liner, for establishing the desired gap 44.

As previously described, the porous liner comprising the top section 38 that mates with a bottom section 42 is fabricated from a porous material. The size of the pores range from 5 to 20 microns, for example. Typically, the smaller the pore size used, the smaller the holes that can be detected in testing a condom 72 or other prophylactic articles for leaks. For the testing of a condom 72, in order to meet FDA requirements, the pore size is about 10 microns. The presently described porous liner 38, 42, was manufactured to the inventors' specifications by Porex Teclnologies of 500 Bohannon Road, Fairburn, Ga. 30281-2828, U.S.A. Note that porous liners of some other desired shape may be used for testing prophylactic articles such as gloves, for example. Also, in the preferred embodiment, the thickness of the thinnest wall section of the porous liner should be at least 0.125 in. to withstand pressurization or inflation of a condom 72 under test to about 100 pounds per square inch. As shown in FIGS. 1 and 2, the top section 38 of the porous liner fits snugly within the bell-shaped cavity 36 of the top housing section 2, the latter being configured to accomplish this. The bottom section 42 of the porous liner fits snugly within the cylindrical cavity 40 of the intermediate housing section 4, as shown, with the latter being configured to accomplish this. When housing sections 2 and 4 are screwed together, the surface of the interior wall portion 104 of the top section 38 is touching the top surface of the interior side wall portion 120 of the bottom section 42, as shown. Note that the top and bottom sections 38 and 42 are configured to the shape of condoms 72 to be tested. In this example, the top section 38 is bell-shaped, and the bottom section 42 is cylindrical with downwardly converging or tapered side portions.

In FIGS. 8, 9, and 10, front elevational, side elevational, and top views, respectively, for each one of the expandable fingers 82 (see FIG. 2) are shown. Each finger 82 includes a rounded and tab-like topmost section 126 from which a centrally located rib 128 projects downward a relatively short distance, and terminates into a cam surface 92 including a flat surface portion 130 for about half of its length, terminating to a diverging sloped surface 132. The diverging surface 132 terminates at a tapered rib-like section 134, the latter terminating at another or second cam surface 96. The cam surface 96, similar to cam surface 92, but of different dimension, includes an upper flat portion 136, and a lower tapered diverging and outwardly sloping surface 138. The outwardly sloping surface 138 terminates at a relatively elongated flat surface 140, which in turn terminates to a relatively narrow foot member 142. The bottom of the foot member 142 includes a slightly widened portion 144. The configuration of the foot member 142 with a widened portion 144, permits air to flow around the foot 142 and through the center portion of the expandable condom holder 78, for inflating a condom 72 under test, as previously described. As shown in the top view of FIG. 10, each expandable finger is configured to traverse an arc Θ of about 90°, or one quadrant. The elastomer member 80 is positioned around four of the fingers 82 for resiliently securing them together to form the column-like condom holder 78. In FIGS. 8 and 9 certain dimensions are shown for purposes of illustration of the typical size of the prototype apparatus associated with this invention. For example, $d_1$ is 0.574 in.; $d_2$ is 0.30 in.; $d_4$ is 0.063 in.; $d_5$ is 0.125 in.; $d_6$ is 0.130 in.; $d_7$ is 0.260 in.; $d_8$ is 0.227 in.; $d_9$ is 0.50 in.; $d_{10}$ is 0.75 in.; $d_{11}$ is 3.25 in.; $d_{13}$ is 1.313 in.; $d_{14}$ is 0.75 in.; $d_{15}$ is 2.313 in.; $d_{16}$ is 0.179 in.; $d_{17}$ is 0.078 in.; $d_{18}$ is 0.25 in.; $d_{19}$ is 0.30 in.; and $d_{20}$ is 0.063 in.

Figure 11:
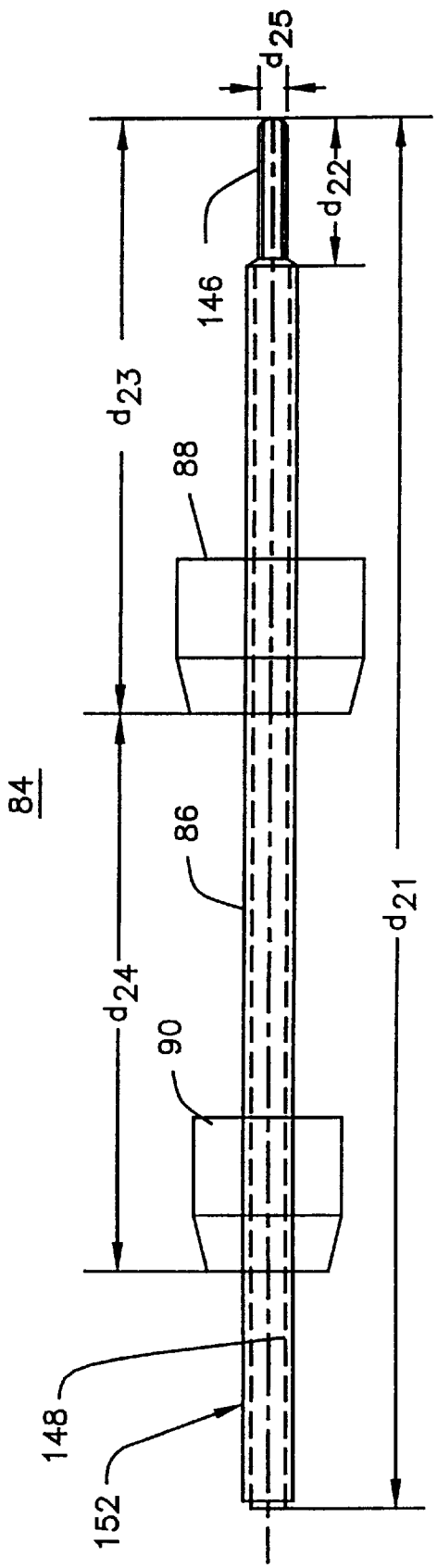
FIG. 11 is a front elevational view of a cam rod subassembly of the expandable condom holder of FIG. 2.
Figure 12:
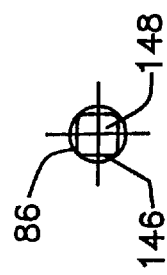
FIG. 12 is an elevational view of one end of the cam rod subassembly of FIG. 11.

In FIG. 11, the cam rod assembly 84 is shown. The cam rod 86 has a length $d_{22}$ of 7.06 in., in this example; a reduced stub-like top end portion 146 has a length $d_{22}$ of 0.569 in.; and has a hollow core portion 148. The first cam section 88 is mounted upon the cam rod 86 with its bottom surface a distance $d_{23}$ of 2.625 inch from the tip of the reduced end portion 146 of cam rod 86. The second cam section 90 is rigidly mounted upon cam rod 86 at a distance $d_{24}$ of 3.25 in between its bottom surface and the bottom surface of the first cam section 88. The width $d_{25}$ of the reduced stub-like top end portion 146 is about 0.188 inch. The top end of the cam rod 86 facing the end of the reduced top end portion 146 is shown in FIG. 12 to have a chamfer.

In FIG. 13A, a front elevational view of the first cam section 88 is shown, and a side elevational view thereof is shown in FIG. 13B. As shown, a threaded hole 150 is formed through the center of the cam section 88 for screwing onto a threaded outer portion 152 of cam rod 86 (see FIG. 11). In this example, the front of the first cam section 88 is square having a dimension $d_{26}$ of 0.607 inch. Diverging tapered side portions 156 extend rearward from the front face 154, and each has a maximum dimension $d_{27}$ of 0.759 inch. The quarter inch threaded hole 150 is centered upon the front face 154. As shown in 13B, the tapered portion of can section 88 has a width $d_{28}$ of 0.25 inch, and the overall length $d_{29}$ of this cam section 88 is 0.625 in., in this example. Also in this example, as shown in the front elevational view of FIG. 14A, and side elevational view FIG. 14B, for the second cam section 90, the front face 158 is square have a dimension $d_{30}$, in this example, of 0.544 inch. The width of the tapered sides 160, which diverge towards the rear have a maximum dimension $d_{31}$ of 0.663 inch. As shown in FIG. 14B, the length $d_{32}$ of the rearward sloping side surfaces 160 is 0.25 in., and the overall length of the second cam section 90 $d_{33}$ is 0.625 inch in this example. Other dimensions can be used, depending upon the application. Also, a threaded hole 161 is centered upon the front face 158. In this application, for purposes of illustration, the dimensions given for the cam rod assembly 84 components, and the expandable fingers 82, provide the necessary expansion of the condom holder 78, for permitting a typical condom 72 to be rolled off holder 78.

As shown in FIG. 15, various embodiments of the present invention for testing condoms 72 or other prophylactic articles can be automated to a large extent. As shown, the bracket 8 has one end rigidly mounted via bolts 160 (only one is shown) to an upright frame (not shown). In this manner, the housing sections 2, 4, and 6 are rigidly secured over the expandable condom holder 78 carried on the movable platform 60, in this example. The movable platform 60 is rigidly mounted on the top of a bracket 164. Also, an air cylinder 166 is rigidly secured to the bottom portion of the movable platform 60, and includes means (not shown) for connecting a control rod from the cylinder 166 to the cam rod 86, for selectively operating the air cylinder 166 to pull the cam rod 86 downward for moving cam sections 88 and 90 to a position causing the expandable fingers 82 to expand upon the elastomer sheet 80, for firmly securing a condom 72 to permit it to be rolled off via the rotating belt or brush assembly 168. A rod 182 retains brush assembly 168, as shown. The bracket 164 is rigidly connected to a bushing 170 mounted upon a linear slide rod 172 via bolts 175.

Figure 16:
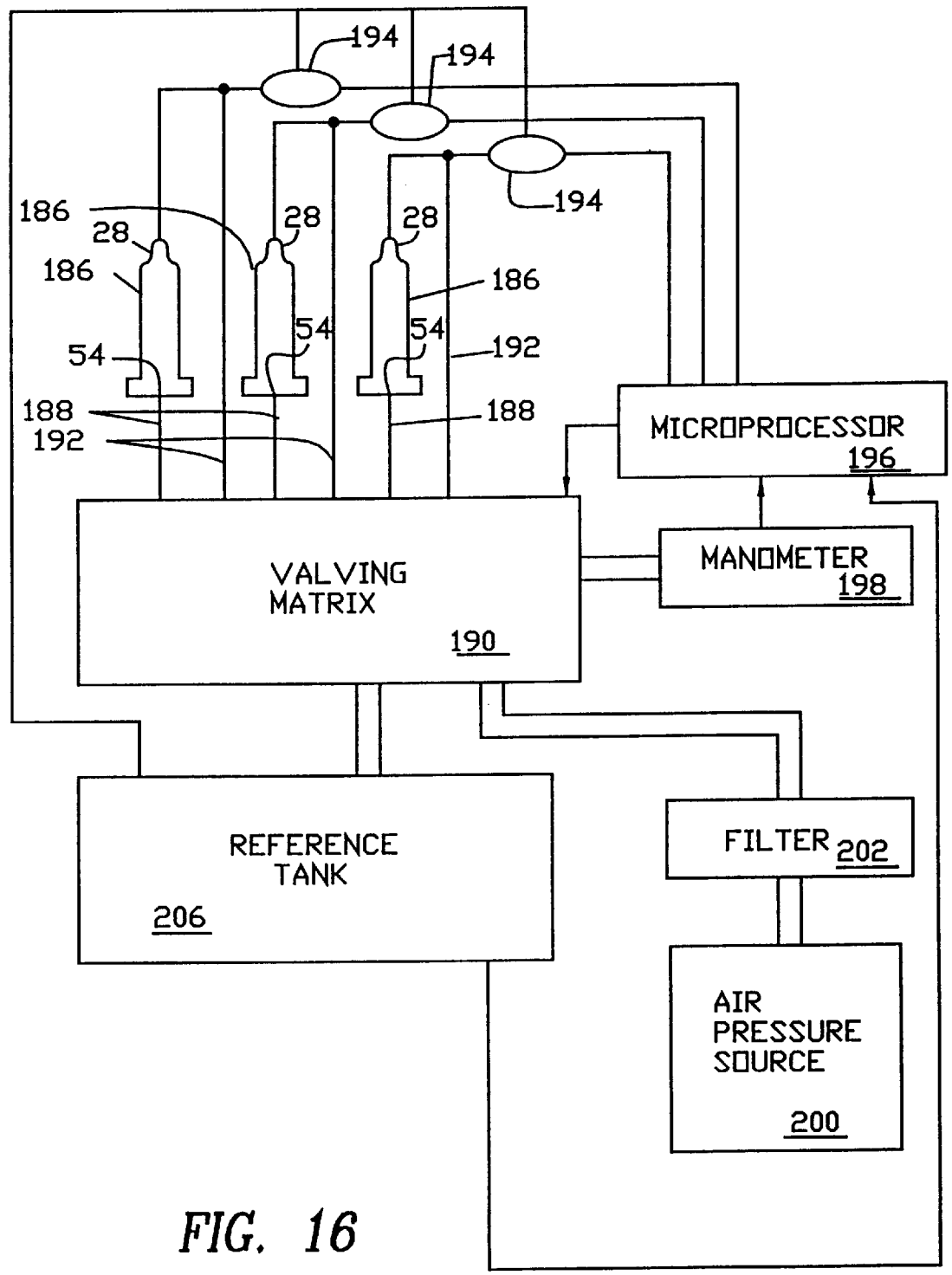
FIG. 16 shows a block diagram for at least partially automating the testing of condoms.

Reference is now made to FIG. 16 for a description of equipment for testing condoms 72 for holes. In one embodiment, a plurality of test apparatus is symbolically shown as porous liner shaped elements 186, each meant to incorporate the apparatus of FIG. 15, in this example. Air lines or air conduits 188 are connected between a valving matrix 190 and the air ports 54 of each one of the test apparatus 186, respectively. Other air lines or air conduits 192 are connected between the valving matrix 190 and air ports 28 of the respective testing apparatus 186. The air lines 192 are also connected to input ports of pressure transducers 194, respectively. The output ports of the pressure transducers 194 are individually connected for providing pressure signals to a microprocessor 196. A manometer 198 is connected to microprocessor 196 and valving matrix 190. An air pressure source 200 is connected through a filter 202 to valving matrix 190. The air pressure source 200 provides a plurality of different pressures via individual pressure lines (not shown) for test pressure, condom extraction, dust blow out, condom holder movement, condom holder expansion, elastomer sheath expansion, and reject condom blow off, respectively. A reference tank 206 provides a stable pressure reference signal to the pressure transducers 194, and microprocessor 196. For short test times, the reference tank 206 can be eliminated, and the current atmospheric pressure can be used as the reference pressure. Control of this equipment in any of the modes of operation is effected by the microprocessor 196. Microprocessor 196 operates valves (not shown) within the valving matrix 190, so as to couple the test apparatus 186 to the air pressure source 200, and the manometer 198. Signals representing whether or not microprocessor 196 finds a leak in each of the condoms 72 under test are provided via individual test apparatus assembly 186, respectively.

Figure 17:
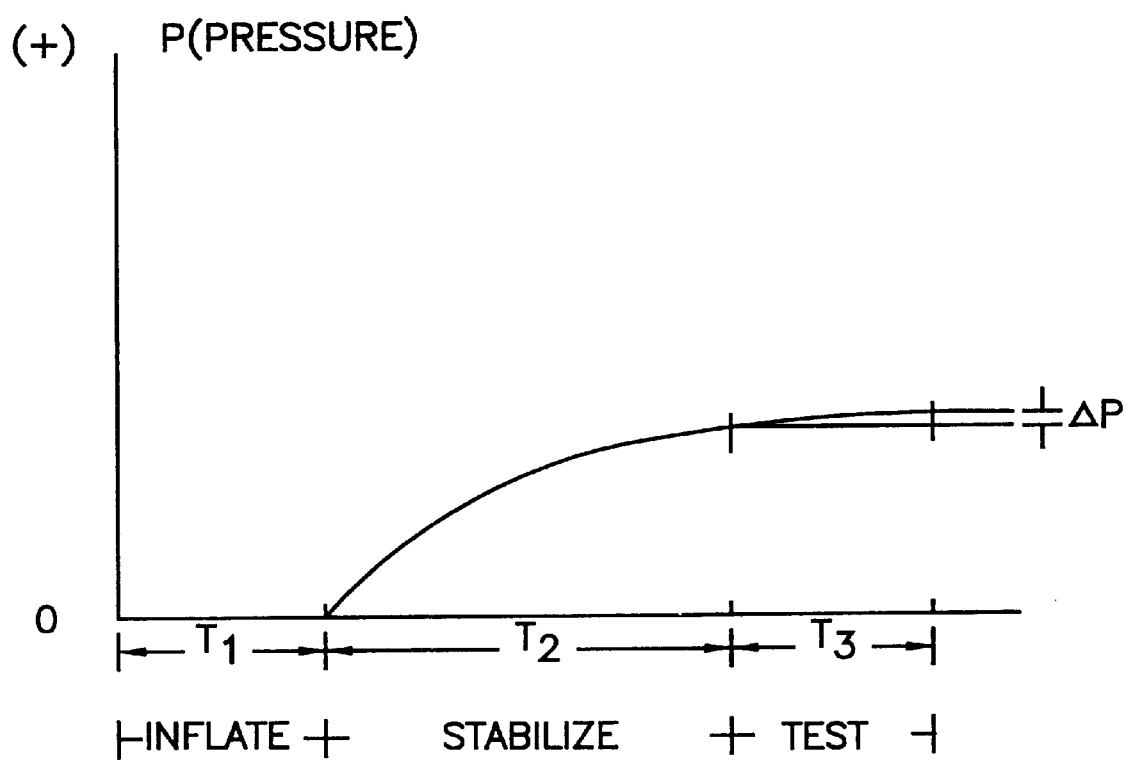
FIG. 17 shows a graph indicating time periods for inflation of a condom under test, stabilization of the pressure in the inflated condom, and testing for the rate of change of pressure, in accepting or rejecting a condom or other prophylactic device being tested.

The pressure transducers 194 are used to measure the pressure within an associated air port 28 of the associated test apparatus 186, and to provide a corresponding pressure signal to microprocessor 196. The associated pressure transducer 194 is used to compare the pressure within air port 28 against the pressure within a reference tank 206, for obtaining a measure of the rate of change of air pressure within the associated air port 28. The manometer 198 is used for measuring the absolute pressure within a condom 72 under test. The filter 202 is used to ensure that pressurized air from the air pressure source 200 is free of contaminants before being delivered to the valves of the valving matrix 190. The microprocessor 196 is programmed to carry out the required testing sequences, and required reporting. The programming includes opening and closing appropriate ones of the valves of the valving matrix 190 at required times, processing signals representative of various measured pressures or rates of change in pressure, fault testing, and so forth. In this regard, a typical testing cycle, as will be described in greater detail below, is shown in FIG. 17.

During a first period of time $T_1$ a condom 72 under test is inflated via microprocessor 196 operating valving matrix 190 to connect air pressure source 200 to an air port 54 of the associated test apparatus 186. After the condom 72 is inflated to within a desired pressure range, typically from 20 to 100 pounds per square inch, a stabilization period $T_2$ is provided for stabilizing the pressure in the associated test apparatus 186. After the stabilization of pressure, a test mode is entered over a time period $T_3$ for measuring the rate of change of pressure within the associated air port 28 of the test apparatus 186. If the rate of change of pressure over predetermined periods of time exceeds a predetermined maximum value, condom 72 under test is rejected. If the rate of change is below a minimum predetermined value, equipment failure is assumed, and the condom 72 is rejected. If neither of the above occurs, the condom 72 is accepted. Note that the microprocessor 196 can further be programmed, for example, to conduct concurrent testing of three condoms 72, in this example, in a sequence where each one of the respective test apparatus 186 is in a different one of the three periods $T_1$, $T_2$, and $T_3$ of operation, respectively. Also, in a given application, the test apparatus and testing system can be designed to simultaneously test any desired number of condoms 72, to a practical limit.

A method for performing the testing of a condom 72 in accordance with various embodiments of the present invention will now be described in detail with particular reference to FIGS. 2, 15, 16, and 17. The microprocessor 196 is programmed to automatically carry out the required steps. The first step is to position the condom holder 78 as shown in FIG. 15, but with the expandable condom holder 78 in its nonexpanded state as shown in FIG. 2. A condom 72 to be tested is then placed over the expandable condom holder 78.

The next step is to move the expandable condom holder 78 into the porous liner 38, 42. As will be explained, this is done by a cam follower 234 riding on a cam track of the machine of this invention. Sufficient force must be applied by the cam 234 to form an air tight seal between the metal seal ring 52 of the bottom housing section 6, the elastomer sheet 80, and the bottom of the condom 72, as shown in FIG. 2.

The next step is to operate the valving matrix 190 for connecting the air pressure source 200 to the air port 54, while venting the air port 28 to the atmosphere, for initiating the first period $T_1$, for inflating the condom 72 with a given air pressure while allowing the air space between the porous liner 38, 42 and housing sections 2, 4, and 6, respectively, to vent to the atmosphere. Note that the inflated condom 72 now has its outside walls forced against the opposing inside walls of the porous liner 38, 42.

After the inflation period $T_1$, the next step is to operate valving matrix 190 to seal or close off the associated air port 28 to isolate the space between the porous liner section 38, 42, and housing sections 2, 4, and 6, respectively, from the atmosphere.

The next step is to retain the test apparatus in its last mode of operation for a second period of time $T_2$ sufficient to permit the air pressure in the spaces between the porous liner 38, 42, and housing sections 2, 4, and 6, respectively, to stabilize.

After the stabilization period $T_2$, a third time period $T_3$ is entered for measuring the rate of pressure increase in the space between the porous liner 38, 42, and housing sections 2, 4, and 6, respectively. This measurement is made by operating valving matrix 190 to maintain a given air pressure from air pressure source 200 to air port 58, while comparing the pressure signal from the associated pressure transducer 194 with the pressure of the reference tank 206. This is accomplished by measuring the pressure at the beginning of the period $T_3$, and at the end of the period $T_3$, and dividing the increase of pressure, if any, by the time $T_3$.

The microprocessor 196 next compares the measured rate of pressure increase against a predetermined standard value. If the measured rate of pressure increase over a predetermined period of time exceeds the predetermined acceptance value, the condom 72 is rejected. If the rate of change is below a minimum predetermined value, equipment failure is assumed, and the condom 72 is rejected. If neither of the above occurs, the condom 72 is accepted.

The valving matrix 190 is operated in the next step for connecting the associated air ports 54 and 28 of the test apparatus 186 to the atmosphere for venting air pressure from inside the condom 72 under test.

In a preferred embodiment of the invention, the testing of the condom 22 is repeated as described above. The purpose of the second test is to attempt to break out weak spots in the condom 72. In this manner, the reliability of the condoms 72 double tested is improved.

The next step is to withdraw by action of the cam 234 on a track to be described the expandable condom holder 78 with the condom 72 mounted thereon from the porous liner 38, 42 and associated housing 2, 4, and 6. During this withdrawal step, in a preferred embodiment, the valving matrix 190 is also operated for injecting pressurized air from air source 200 into the associated air port 28, for substantially preventing the condom 72 from sticking to the inside wall surface of the porous liner sections 38, 42, thereby aiding in extraction of the condom 72 on the condom holder 78.

If the condom 72 has been rejected, the next step is to blow the rejected condom 72 off of the expandable condom holder 78, in this example. This is accomplished by extracting condom holder 78 from housing 2, 4, 6, followed by injecting pressurized air into port 54. Alternatively, an external air jet can be used for this purpose.

Alternatively, if the condom 72 has been accepted, the next step is to operate air cylinder 166 for pulling the cam rod assembly 84 downward or in a direction for moving the expandable fingers 82 away from one another to the expanded position as shown in FIG. 15. Note that in a practical system, this step may be carried out regardless of whether a condom 72 has been rejected and previously blown off the condom holder 78, or accepted and remains on the condom holder 78. It is preferable to not expand the fingers 82 if a condom 72 is rejected, in that this provides a safety margin in case the rejected condom 72 removal system fails to function.

The next step is to roll accepted condoms 72 off the expandable condom holder 78 by moving the rotating belt or brush 180 against the condom 72. The rolled condom 72 automatically pops off of the top of the condom holder 78, where after the condom 78 is blown through a chute 245 for deposit into a bin 247 (see FIG. 21).

The next step is to operate air cylinder 166 for moving the cam rod 86 upward to disengage the cam sections 88 and 90 from the expandable fingers 82, for returning the expandable condom holder 78 to its nonexpanded state. Note that the elastomer sheet 80 acts as a return spring, for providing the force for moving the expandable fingers 82 towards one another as the cam sections 88 and 90 are disengaged therefrom.

The next step is to operate the valving matrix 190 for applying high pressure air from air pressure source 200 to air port 28, for blowing out any powder that may have collected upon the inside surfaces of the porous liner sections 38, 42 from the condom 72 that had been tested.

The last remaining step in the illustrated preferred cycle of operation is to operate the valving matrix 190 for connecting air ports 28 and 54 to the atmosphere, thereby venting the space between the porous liner sections 38, 42, and housing sections 2, 4, and 6, respectively, to the atmosphere.

During a typical cycle of testing a condom 72, in the inflation period $T_1$, the manometer 198 can be used for determining whether the pressure within the condom is increasing at a predetermined rate, which if not obtained will result in the microprocessor 196 operating to reject the condom 72. Also, the microprocessor 196 can further be programmed to keep track of the number of condoms 72 rejected during inflation periods, for determining whether the test apparatus 186 should be checked for proper operation if an excessive number of condom 72 are so rejected. Also, the microprocessor 196 can be programmed to monitor the operation of the test system, by keeping track of the number of condoms 72 rejected and the number accepted by each test apparatus 186. If there are no rejects for a predetermined number X of tests or no acceptances for Y tests, the system is shut down for servicing of the test apparatus 186. Also, programming can provide that if there are no rejects made by the given test apparatus 186 for a predetermined number of tests or no acceptances for another predetermined number of tests, that the system should be shut down for servicing.

Another modification that can be made, for example, includes the use of a tag gas for inflating a condom 72 instead of air, whereby instead of testing for increases of pressure in a region outside of the condom 72, a detector can be employed for detecting the presence of tag gas outside the condom 72 to detect a leak or hole in the condom 72. Alternatively, both a tag gas and a rate of change of differential pressure, as previously described, can be employed at the same time for testing a condom 72. Still further, in another modification or embodiment, a low molecular weight gas, such as Helium, can be used in place of pressurized air, for reducing test time due to the faster flow rate of Helium through a hole in a condom 72 relative to air. Also, although condoms have been used in illustrating various embodiments of the invention, many other prophylactic devices can be tested by the present embodiments of the invention, and the associated porous liner 38, 42 can be shaped as required.

Another modification, representative of an alternative embodiment, is to test a condom 72 by keeping the air port 58 of the bottom housing section open to the atmosphere while drawing a vacuum at air port 28. Relative to FIGS. 1, 2, and 15, with the condom holder 68 or expandable condom holder 78 inserted with condom 72 within the porous liner 38, 42, the condom 72 will in effect be inflated and in this case pulled against the inside walls of the porous liner 38, 42. Leaks can then be detected by monitoring the decrease in vacuum within air port 28, or rate of increase of pressure therein, for detecting leaks in condom 72. As in prior embodiments, the rate of change of pressure is compared against a standard or predetermined pressure for determining whether a condom 72 under test is to be accepted or rejected.

Note that the porous liner 38, 42 is in two sections because a tapered shape is required for testing tapered condoms, but the porous liner can be provided in one piece for testing non tapered, straight walled or elastic condoms. Also, note that the metal ring seal 52 can be replaced by an elastomeric inflatable seal, for example.

A machine of this invention for carrying out the testing operations described above will now will be described by reference to FIGS. 18 through 24.

Figure 18:
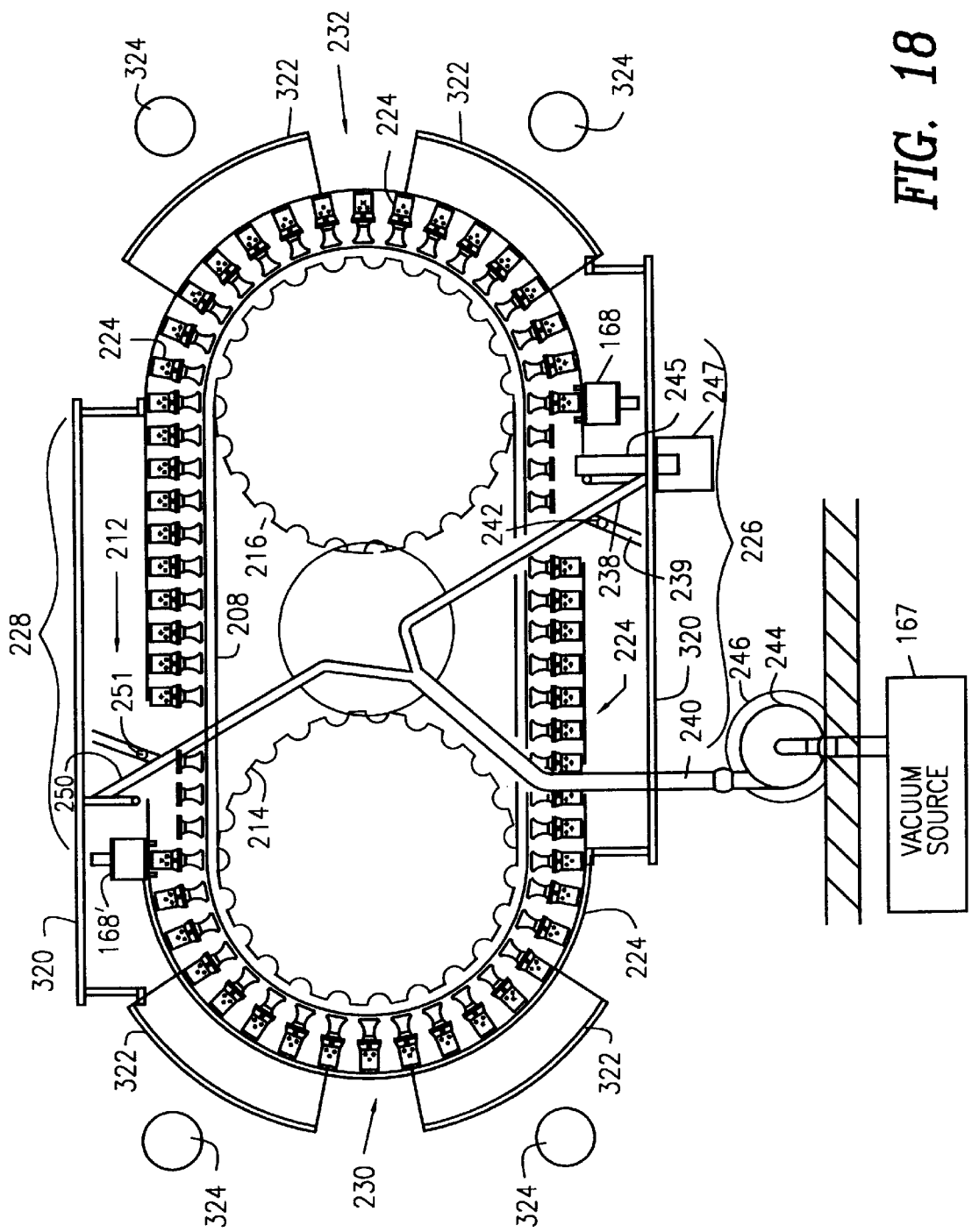
FIG. 18 is a top view of a machine for one embodiment of this invention in which means for connecting air tubes and electrical conductors to the testing devices are eliminated in the interest of clarity.
Figure 19:
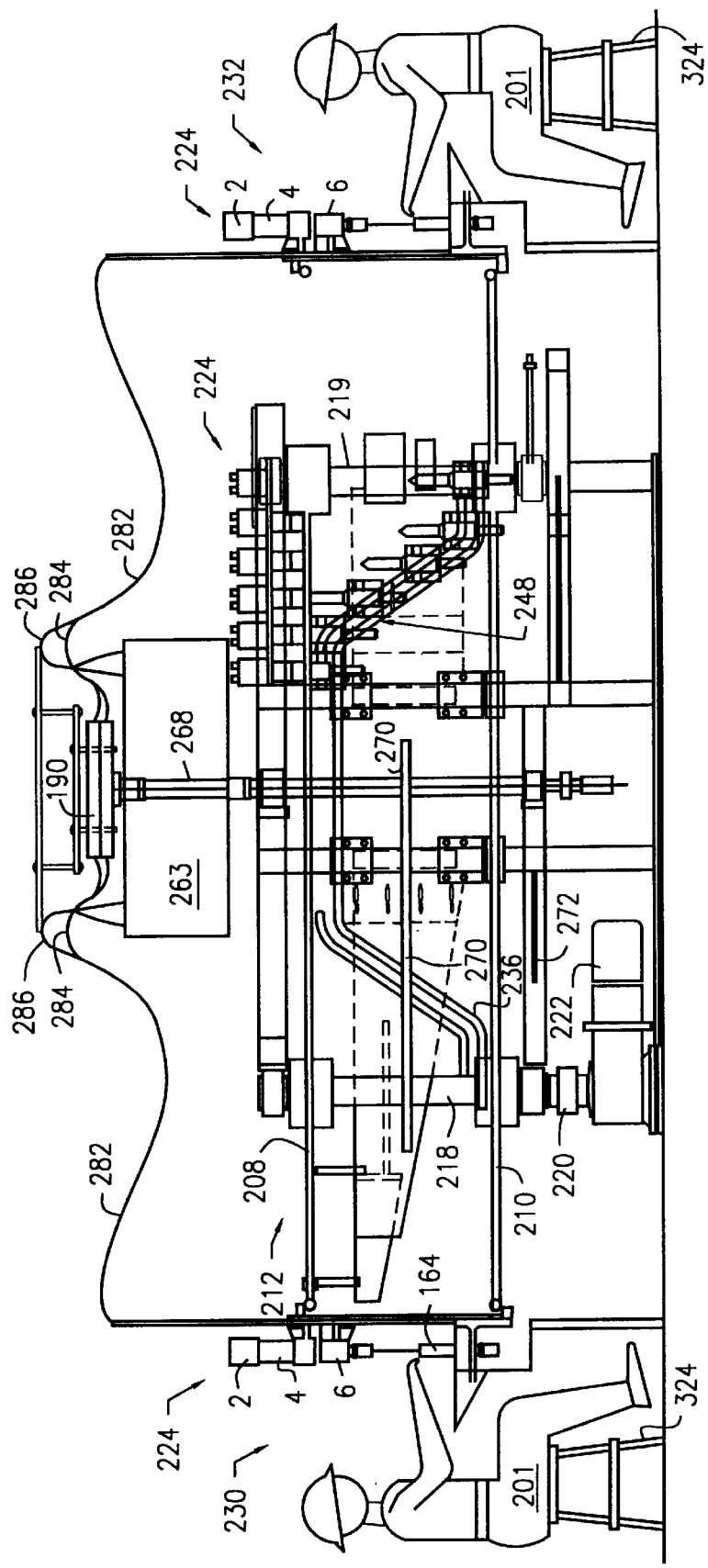
FIG. 19 is a side view of the machine of FIG. 18 showing cam tracks for inserting condoms on holders or mandrels into porous liners of test chambers of test device for testing, the location of means for removing and collecting defective and acceptable condoms, and means for coupling air tubes and electrical connectors to the testing devices.
Figure 20:
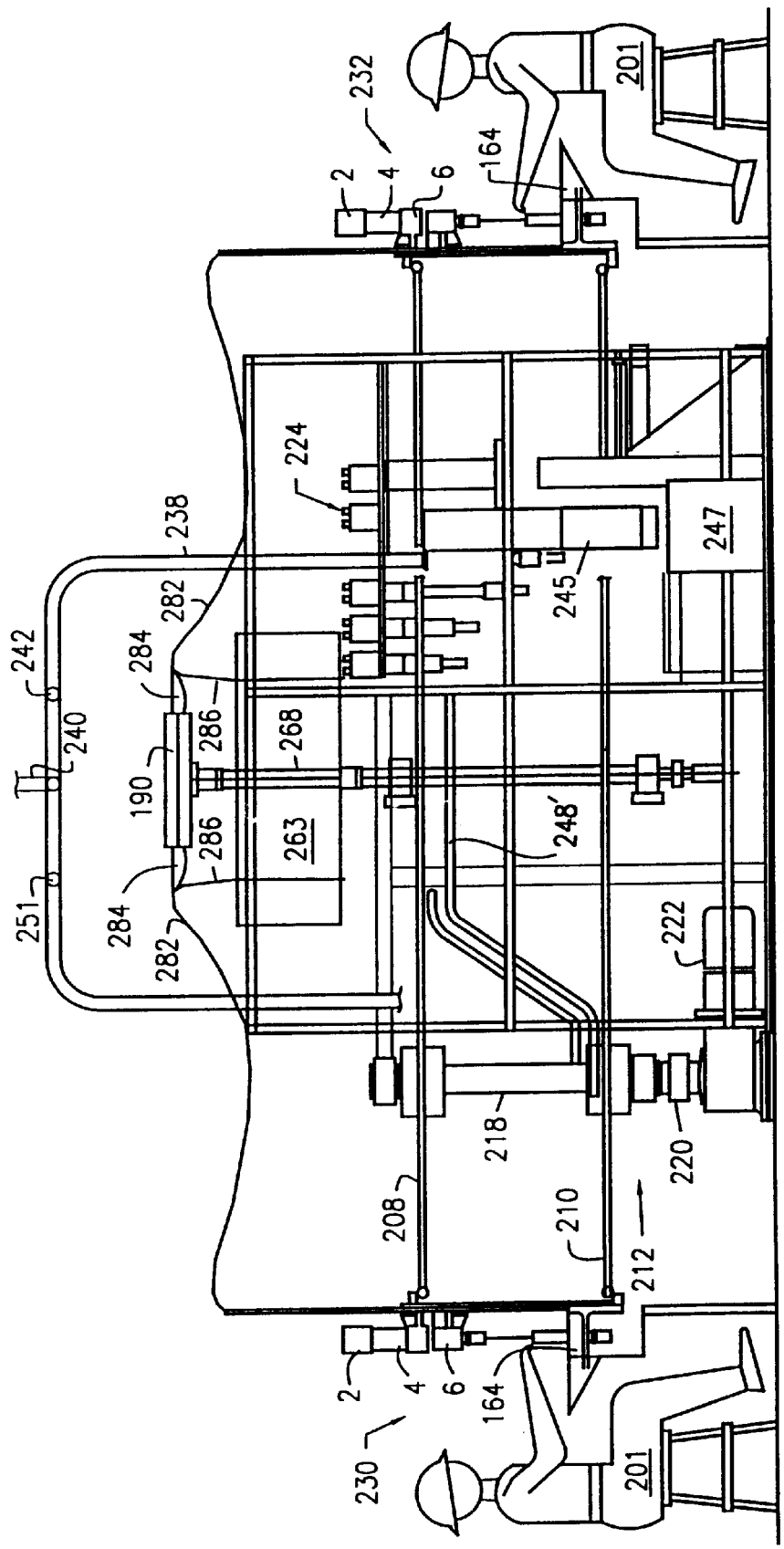
FIG. 20 is similar to FIG. 19 except that some structure of the machine on the viewed side is removed in order to reveal structure on the other side.

FIG. 18 is a top view of a machine incorporating this invention that for simplicity omits air tubes and electrical conductors required for each of a plurality testing devices 224, and FIGS. 19 and 20 are side views. In FIGS. 19 and 20, a chain 208 is shown as being located over an identical chain 210, and both chains are driven around closed paths in the direction of arrows 212 by any suitable means. In this example, the chain 208 is entrained around sprockets 214 and 216 (see FIG. 18), and similar sprockets, not shown, are provided for the chain 210. As further shown in FIGS. 18, 19 and 20, the sprocket 214 for the chain 208, and the sprocket, (not shown), for the chain 210 that is below the sprocket 214 are mounted on a shaft 218 that is rotated by suitable coupling 220 to a gear motor 222. The sprocket 216 for the chain 208, and the sprocket, (not shown), for the chain 210 that is below the sprocket 216 are mounted on a shaft 219.

A plurality of testing devices 224 such as shown in FIG. 15 are mounted between the chains 208 and 210 at points around their paths. Their top brackets 8 are attached to the chain 208, and their bottom brackets 19 are attached to the chain 210 in any suitable manner so that each testing device is vertical. The bracket 164 that supports the moveable platform 60 is mounted by the bushing 170 so as to slide up and down the slide rod 172. In all positions of the detecting devices 224 around the chains 208 and 210, except some of those within brackets 226 and 228, the condom holders 78 are in their lower position, as shown in FIG. 15, so that condoms 72 can be drawn down over them. This can be done by operators 201 at loading stations 230 and 232 at either end of the machine or by automated loaders not shown.

After the testing devices 224 are loaded with condoms 72 to be tested at the loading station 230, for example, they move into the portion of the closed paths of the chains 208 and 210 indicated by the bracket 226 where the cam track followers 234 (see FIG. 15) engage an upwardly extending portion of cam track 236 (see FIG. 19). Engagement between the cam track followers 234 and the cam track 236 causes their brackets 164 to be raised from the position shown in FIG. 15 so as to insert the associated condom holders 78 and the condoms 72 mounted on them into their associated the housing sections 2, 4, and 6, respectively. Additional upper and lower cam tracks and cam track followers (not shown) are used to prevent cam track 236 from forcing the entire test head/chain assembly to rise. While the condoms 72 are so inserted, they are inflated so as to force them against the porous liner 38, 42 (FIG. 15), and the test for leaks is carried out as previously described.

Figure 21:
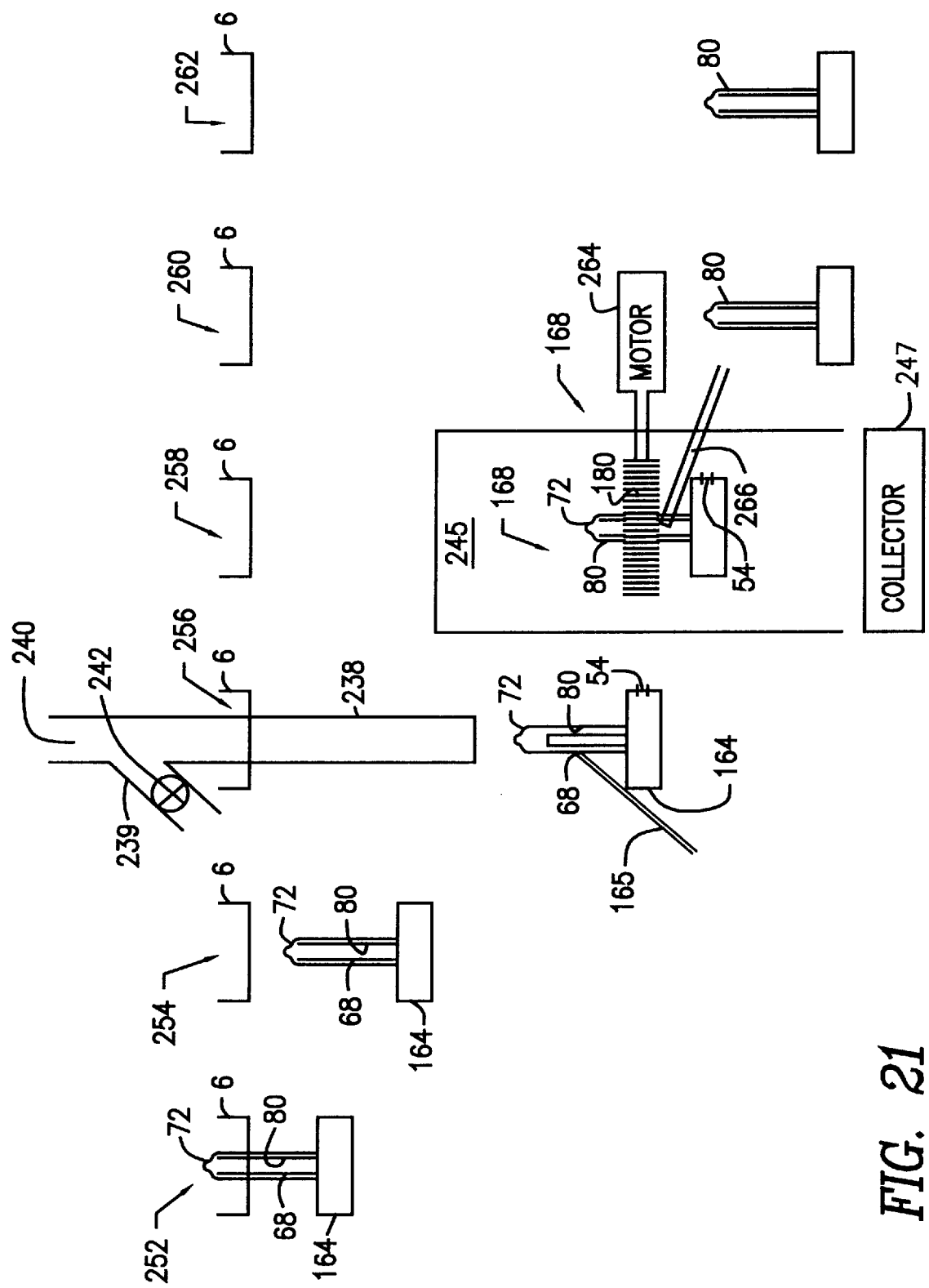
FIG. 21 is a simplistic schematic diagram illustrating the way in which defective and acceptable condoms are removed from the test devices and collected.

After the testing is completed, a testing device 224 encounters a downwardly extending cam track 248 (see FIG. 19) that acts on its cam follower 234 to move the associated bracket 164 down, and withdraw the condom holder 78 from the housing section 2, 4, and 6. Defective condoms 72 are removed as illustrated in FIG. 21 by retaining the retraction of the fingers 82, blasting air through the air port 28 so as to unstick them from the porous liner 38, 42 with the result that the condom 72 hangs loosely about the sheath 80, and supplying a blast of air to the air port 54, and to the external air jet 165. Condoms 72 removed in this manner are sucked through tubes 238 and 240 (see FIG. 18) by closing a valve 242 in tube 239 to maximize the vacuum in tube 238. The condom 72 passes through tube 240 to a vacuum filtration unit 244, and vacuum source 167. The condoms 72 are deposited in a collector 246 that is located under vacuum filtration unit 244.

Acceptable condoms 72 are removed by the brush assembly or ring roll mechanism 168 to be described by reference to FIG. 21 while the fingers 82 are expanded for exerting outward forces on the elastomer sheath 80 and on the condom 72. The accepted condoms 72, when rolled up, are blasted by air from tube 266 to move them via a chute 245 into a collector 247. The fingers 82 then retract. After a defective or acceptable condom 72 has been removed therefrom, the testing device 224 then proceeds to the loading station 232 at which condoms 72 to be tested are placed on the condom holders 78.

The other side of the machine is the same as that just described. The leak testing procedure is carried out while the testing devices 224 are traveling within the area of bracket 228 (see FIG. 18). To transport defective condoms 72, valve 251 is closed to maximize the vacuum in tube 250. Condoms 72 are transported via tube 250 and the tube 240, and deposited in a collector 246. Acceptable condoms are removed by a brush assembly or ring roll mechanism 168' and conducted by a chute 245' to a collector 247', (see FIG. 24).

FIG. 20 is from the same side of the machine as FIG. 19 but omits the cam track 236 as well as the testing devices 224 on that side in order that the corresponding portions on the remote side of the machine can be seen. For example, a portion of the cam track 248' on the remote side of the machine is visible, and testing devices 224 that are on a rising cam track portion (not shown) are shown.

FIG. 21 illustrates in greater detail the manner in which defective and acceptable condoms are removed from a condom holder 68 having expandable fingers 82. Successive positions of the testing device 224 are numbered from left to right as 252 through 262. At the leftmost position 252, the condom 72 has been tested, and a blast of air has been introduced through the air port 28 to unstick it from the porous liner 38, 42. The bracket 164 that supports the condom holder 68 with a condom 72 mounted thereon is just starting to withdraw the condom holder 68 and the condom 72 from the bottom housing section 6 for the porous liner 38, 42. The fingers 82, not shown, remain retracted. At the position 254, the condom 72 is completely withdrawn from the housing section 6.

When in the position 256, the condom 72 is aligned with the tube 238, the expandable fingers 82, not shown, are not expanded, if the condom 72 is defective. The condom 72 then fits loosely around the sheath 80. The vacuum valve 242 is closed so that vacuum in the tube 240 is coupled solely to the tube 238, and a blast of compressed air from tube 165 is applied to carry the condom 72 into and through the suction tubes 238 and 240 to the collector 246. No further operations are performed on the testing device from which a condom 72 has been removed at the subsequent positions 258 through 262.

If, however, the condom 72 is acceptable, the fingers 82 are extended at the position 256 rather than being retracted as just explained. Vacuum valve 242 is opened so that vacuum in tube 240 is split between tube 238 and tube 239. Nothing is done at the position 256. Thus at the position 258, the condom 72 fits tightly onto the elastomer sheath 80 rather than loosely as was the case for a defective condom. It is removed therefrom by the takeoff mechanism 168. The takeoff can be accomplished by a brush, roller, belt, or other means. As shown, the takeoff mechanism 168 includes a motor 264 that rotates the brush 180 so as to the roll up condom 72 upward as the bracket 164 that supports the condom holder 68 with a condom 72 mounted thereon is moved downward. A blast of air from a tube 266 causes the rolled up condom 72 to be ejected from the elastomer sheath 80 and to fall into the chute 245 that leads to the collector 247. At the positions 260 and 262, the fingers 82, not shown, are retracted so that the sheath 80 is of smaller diameter, thus making it easy to place a condom onto it at the loading station 232.

Although a condom holder 68 having the expandable fingers 82 is preferred, the stationary condom holder of FIG. 1 could be used in the machine described. In this case, the defective condoms would be removed at the position 256 by rolling them off with a brush in the same manner as the acceptable condoms were removed at the position 258, but would otherwise be sucked through the tubes 238 and 240 and deposited in the collector 246 as previously explained.

As can be understood from FIG. 16, a number of air conduits and electrical connections must be coupled between the valving matrix 190, and the shaped element 186 of each of the testing devices 224, and, in a preferred way of identifying leaks, a transducer 194 is connected between each testing device and the microprossor 196.

Figure 22:
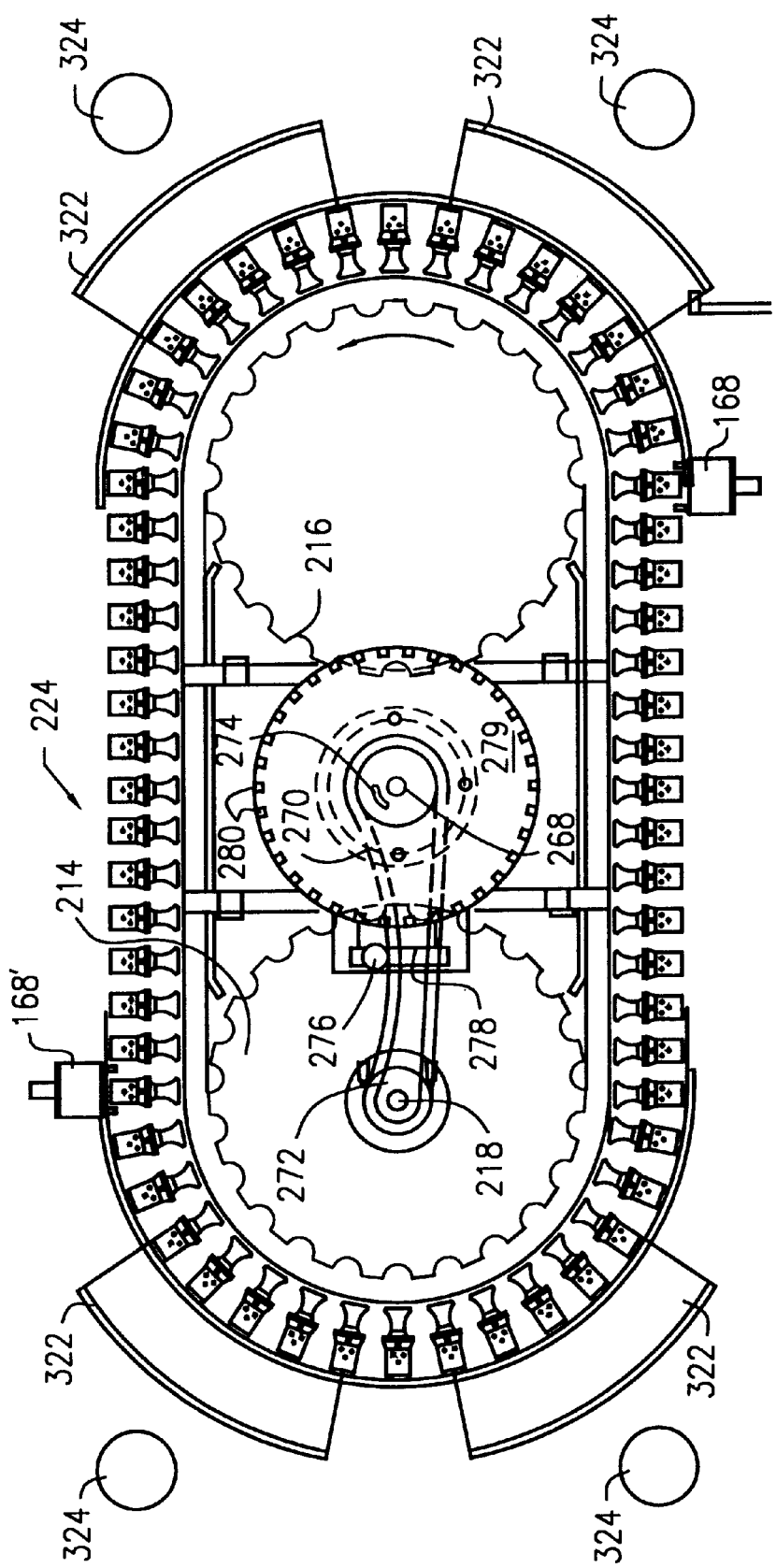
FIG. 22 is similar FIG. 18 except that certain upper structure has been removed so as to reveal how testing devices are advanced around a closed path.

FIGS. 19, 20, and 22 illustrates how the required air and electrical connections to the revolving testing devices 224 are made. For ease of understanding, in FIGS. 19 and 20 the valving matrix 190 and a microprocessor means 263 are shown mounted so as to rotate with a shaft 268 that as best seen in FIG. 22 is driven by coupling to the shaft 218. In this particular embodiment, the coupling is achieved by entraining a chain 270 around a driver sprocket 272 affixed to the shaft 218. A driven sprocket 274 is affixed to the shaft 268 and an idler sprocket 276. The idler sprocket 276 is mounted on a bracket 278 that has a spring, not shown, for urging the idler sprocket against the chain 270 so as to keep it taught. A rotary data transmission ring 279 is mounted so as to rotate with the shaft 268. Cables 282 pass through a notched plate 280 to maintain synchronization. As shown in FIG. 19, the cable 282 includes air conduits 284 from the valving matrix 190 and electrical conductors 286 from the microprocessing means 263. In the preferred embodiment, the valving matrix for each test head 224 is installed immediately adjacent to and within the top and bottom portions of the respective test head 224.

Figure 23A:
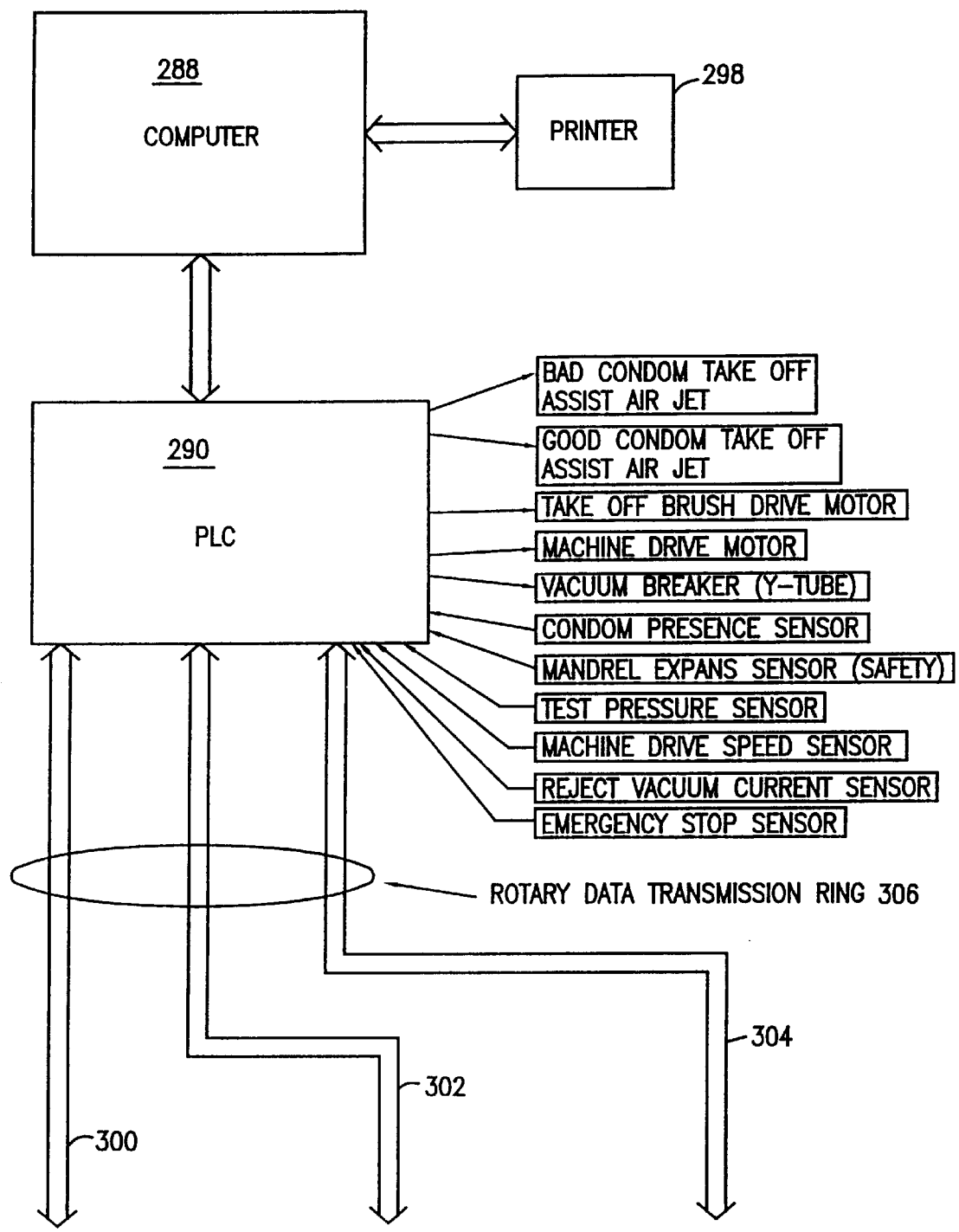
FIGS. 23A and 23B illustrate the functional relationship between a computer, a printer and PLCs for controlling elements of the machine.
Figure 23B:
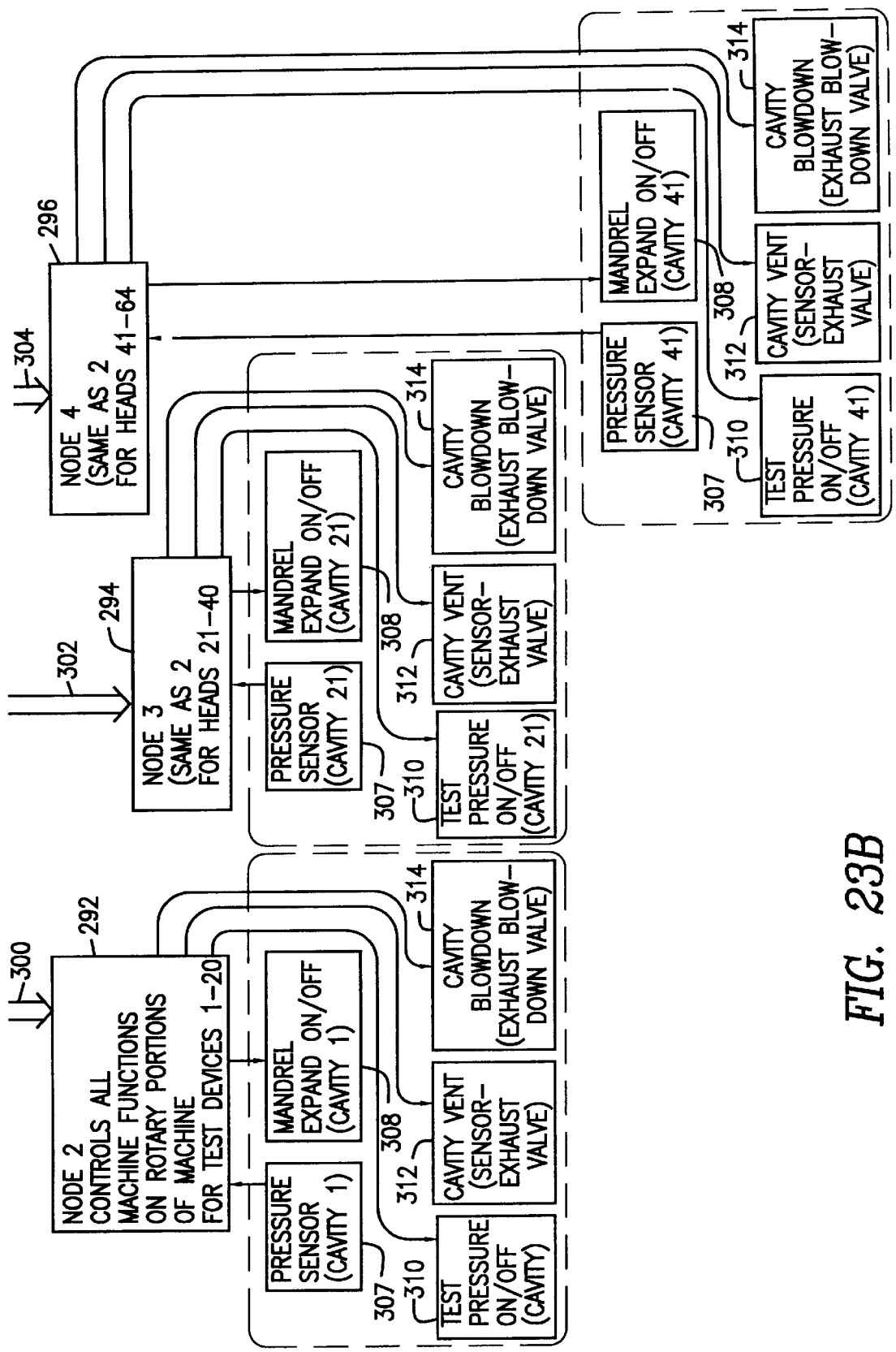

Reference is made to FIGS. 23A and 23B for a description of the overall manner in which the machine is controlled. A computer 288 cooperates with a PLC 290 that controls all machine functions on the stationary portions of the machine, and it, in turn, cooperates with the PLC's 292, 294, and 296 that respectively control all machine functions on the rotary portions of the machine for three groups of the testing devices 224 e.g. testing devices 1–20, 21–40, and 41–64, respectively. The computer 288 also cooperates with a printer 298 so as to record information useful in assessing the operation of the machine as well as data as to the number of condoms that pass the leak tests. Cables 300, 302, and 304 carry electrical signals between the PLC 290 and the PLC's 292, 294, and 296 respectively, said signals passing through a rotary data transmission ring 306. The PLC's 292, 294, 296 are mounted with the valve matrix 190 to rotate around with the testing devices 224 at the centers of their respective groups. In other words, the microprocessor means 263 (see FIG. 19) includes PLC's 292, 294, and 296.

As listed in FIG. 23A, the PLC 290 responds to various switching and sensing devices, not shown, to perform the following operations, turning the drive motor 222 on and off, responding to emergency stop sensors, not shown, but located at different points around the machine to turn off the motor 222, responding to a sensor for maintaining the programmed speed of the chains 208 and 210, indicating when a condom is properly mounted on a condom holder 68, responding to sensors at the end of each takeoff mechanism to assure that the expandable fingers 82 have retracted, responding to a pressure sensor for detecting pressure to the test heads 224, responding to the reject vacuum current sensor to assure reject condom vacuum system 167 is running, operate vacuum valves 242 and 251 when a bad condom 72 is to be removed, activating a bad condom 72 take-off assist air jet 165, operating the brush motor 264, and operating the good condom assist air jet 266 when a good condom is to be removed.

The functions controlled by the PLC's 292, 294., and 296 are identical and are set forth in a block diagram associated with each in FIG. 23B, but only the block diagram for the PCL 292 will be explained. Corresponding blocks for the PLC's 294 and 296 are designated by the same numbers used to designate the blocks for the PLC 292. Each of the functions is performed for each of the testing devices in a group i.e., the PLC 292 performs them for each of the test devices 1–20, the PLE 294 performs them for the testing devices 21–40, the PLC 296 preforms them for the testing device 41–64. Of course, the functions are not necessarily performed for all for the testing devices in a group at the same time.

The functions performed include those set forth in the blocks 307, 308, 310, 312, and 314, which are respectively for activation and reading of the pressure sensor 194 for a testing device 224, expanding the fingers of a mandrel, turning the test pressure on and off, venting the cavity 70 (see FIG. 1), and turning the blowdown air on and off for blasting a condom out of an associated porous liner 38/42.

Figure 24:
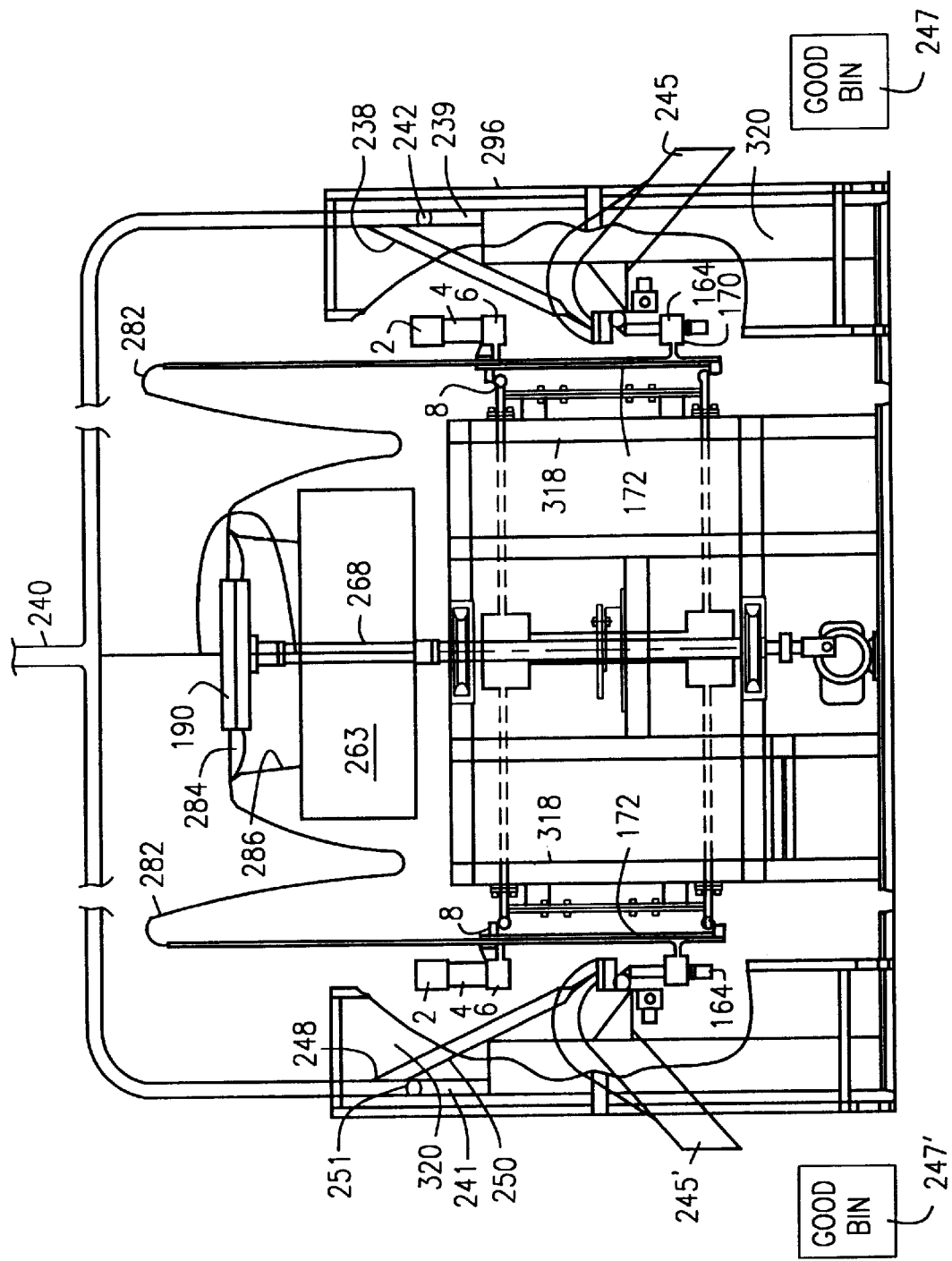
FIG. 24 is an end view of a machine of an embodiment of this invention showing that testing is preformed on both sides of the machine.

FIG. 24 is an end view of the machine in which the frame to which various elements of the machine are attached is comprised of support members 318. Chutes 245 and 245' via which good condoms flow to collectors 247 and 247' are shown on opposite sides of the machine respectively.

Protective transparent panels 320 indicated in FIG. 18 and 24 are spaced around the machine to guard against worker injuries. Work tables 322 are located at each end and stools 324 are provided, as shown.

Although various embodiments of the invention have been shown and described herein, they are not meant to be limiting. Those of skill in the art may recognize various modifications to these embodiments, which modifications are meant to be covered by the spirit and scope of the appended claims.

What is claimed is:

1. A system and apparatus for successively testing a plurality of prophylactic devices for holes, comprising:
   a plurality of test fixtures each for testing a prophylactic device for holes, each of said test fixtures including:
   a housing;
   a rod; and
   a prophylactic device holder, whereby said housing is rigidly mounted upon an upper end of said rod which is vertically oriented, and said holder is mounted for movement on said rod below said housing, whereby said holder can be moved into and out of said housing;
   means rigidly attached to upper and lower ends of the rods of said test fixtures in spaced relationship, for rotating said plurality of test fixtures in a closed path;
   means attached to each one of said holders, for maintaining said holders withdrawn from said housing, respectively, over a first portion of said closed path to permit prophylactic devices to be installed on said holders for testing, for moving said holders into said associated housings, respectively, over a second portion of said closed path, for retaining said holders in respective said housings over a third portion of said closed path, and for withdrawing said holders from said housing, respectively, over a fourth portion of said closed path;
   means for operating each one of said plurality of test fixtures over said third portion of said closed path for testing for holes in an associated said prophylactic device, and specifically identifying which of said plurality of test fixtures are carrying defective prophylactic devices, and which are carrying acceptable prophylactic devices; and
   means responsive to said operating means for removing said prophylactic devices from holders over said fourth portion of said closed path including means for separating defective prophylactic devices from acceptable prophylactic devices at the time of removal.

2. The system and apparatus of claim 1, wherein said rotating means includes:
   first and second chains respectively forming a closed path;
   means for mounting said first and second chains so that their closed paths are in spaced parallel planes, the path of the first chain being under the path of the second chain;
   means for driving said chains in a given direction along their respective closed paths; and
   said plurality of rods having one end secured to said first chain and the other end secured to said second chain.

3. The system and apparatus of claim 2, wherein said holder moving means, includes:
   a cam track follower mounted on each prophylactic device holder;
   at least one cam track around a portion of the circumference of said closed path, said cam track having a first slope extending along said given direction from said first chain toward said second chain, a second slope extending along said given direction from said second chain toward said first chain, and a first intermediate section between the end of said first and second slopes that are proximate said second chain;

whereby each prophylactic device holder housing, as its cam track follower engages said first slope of said cam track, moves its associated holder into its housing, which holder remains inserted in its housing as its cam track follower engages said first intermediate section of said cam track, and moves back along its rod so as to be withdrawn from its housing as its cam follower engages said second slope of said cam track.

4. A machine for testing and separating prophylactic devices having leaks from those that do not have leaks, comprising:

first and second chains respectively forming a closed path;

means for mounting said first and second chains so that their closed paths are in spaced parallel planes, the path of the first chain being under the path of the second chain;

means for driving said chains in a given direction along their respective closed path;

a plurality of rods having one end secured to said first chain and the other end secured to said second chain;

a plurality of housings secured to the second end of each of said plurality of rods, respectively;

a plurality of prophylactic device holders mounted for movement upon individual ones of said plurality of rods, respectively, below an associated one of said plurality of housings, respectively, whereby each holder can move upward to be inserted into an associated housing;

a cam track follower mounted on each prophylactic device holder;

at least one cam track having a first slope extending along said given direction from said first chain toward said second chain, a second slope extending along said given direction from said second chain toward said first chain and an intermediate section between the end of said first and second slopes that are proximate said second chain;

whereby each prophylactic device holder housing, as its cam track follower engages said first slope of said cam track, moves its associated holder into its housing, which holder remains inserted in its housing as its cam track follower engages said intermediate section of said cam track and moves back along its rod so as to be withdrawn from its housing as its cam follower engages said second slope of said cam track;

means for supplying gas under pressure to the inside of a prophylactic device mounted on a prophylactic device holder when the prophylactic device holder is positioned along said intermediate section of said cam track;

means coupled to each housing for identifying prophylactic devices as defective that leak gas, as well as those that do not leak gas and are considered acceptable;

means for removing the defective prophylactic devices from their holders after the holders have been withdrawn from their housing; and means for removing the acceptable prophylactic devices from their holders after the holders have been withdrawn from their housing.

5. A machine as set forth in claim 4, further comprising:

means for injecting gas between a prophylactic device and the housing into which it has been inserted prior to the withdrawal of the prophylactic device from its housing so as to reduce any adhesion between them.

6. A machine as set forth in claim 4, wherein:

each prophylactic device holder has a plurality of outwardly expandable fingers for expanding an outer sheath to frictionally engage a prophylactic device mounted thereon;

means for retaining retraction of the expandable fingers after a prophylactic device mounted thereon has been found to leak and thus be defective; and said means for removing a defective prophylactic device from its holder includes means for injecting a jet of gas into it after it has been withdrawn from said housing in said second slope.

7. A machine as set forth in claim 6, wherein said means for removing a defective prophylactic device from its holder further includes:

a tube having one end proximate a collection bin for leaky prophylactic devices and the other end adjacent said holder so as to receive a prophylactic device removed from the holder by said jet of gas.

8. A machine as set forth in claim 7, further comprising:

mean for supplying a vacuum to said tube.

9. A machine as set forth in claim 4, wherein:

each prophylactic device holder has outwardly expandable fingers for creating frictional engagement between a prophylactic device mounted on a sheath surrounding said fingers;

means for expanding said fingers into an expanded position after a prophylactic device mounted thereon has been found not to leak in said intermediate section, as said device holder moves onto the second slope of said cam; and means for rolling said prophylactic device off of said holder.

10. A machine as set forth in claim 4, wherein said gas supplying means and said identifying means are operable for at least double testing said prophylactic devices in a given test cycle.

11. A machine for testing and separating prophylactic devices having leaks from those that do not have leaks comprising:

a plurality of assemblies including a housing containing a porous liner and a holder for a prophylactic device that can be inserted or withdrawn from a porous liner in said housing;

means for moving said assemblies around a closed path in sequence;

means for maintaining said holders withdrawn from said housings along at least a first portion of said closed path so that prophylactic devices can be mounted on said holders;

means for mounting prophylactic devices on said holders, respectively;

means for inserting said holders into said housings, for maintaining them in said housing and withdrawing them from said housings along second, third and fourth portions of said path, respectively;

means for applying gas under pressure to the inside of a prophylactic device of an assembly in said third portion of said path;

means for indicating the differential gas pressure between the exterior of a prophylactic device and the atmosphere that occurs while the associated said housing is in the third portion of said path;

means responsive to the indicated differential in pressure for indicating whether a prophylactic device leaks or does not leak in accordance with predetermined test criteria;

means for removing prophylactic devices that leak or are defective from their holders when the latter are withdrawn from their housing within said fourth portion of said path; and means for removing prophylactic devices that do not leak from their holders when the latter are withdrawn from their housing within said fourth portion of said track.

12. A machine as set forth in claim 11, further comprising:

means for supplying gas under pressure between a prophylactic device and the adjacent porous liner near the end of the third portion of said path so as to reduce any adhesion between them.

13. A machine as set forth in claim 11, wherein said holder includes expandable finger means operable for frictionally engaging a prophylactic device during said fourth portion of said path.

14. A machine as set forth in claim 13, wherein said means for removing prophylactic devices that leak includes:

said finger means remaining retracted; and means for applying gas under pressure to the prophylactic device after it has been withdrawn from said housing during said fourth portion of said path to blast the prophylactic device off of its holder.

15. A machine as set forth in claim 14, further comprising:

a suction tube having one end adjacent a collector, and another end positioned to receive a prophylactic device blasted away from its holder.

16. A machine as set forth in claim 15, further comprising:

means for coupling said tube to a source of vacuum.

17. A machine as set forth in claim 13, wherein said means for removing prophylactic devices that do not leak includes:

said finger means being operated to expand said fingers in said fourth portion of said path; and a rotating brush roller, or belt for rolling said devices off of associated said holders, respectively.

18. A machine as set forth in claim 17, further including:

a chute located so as to receive prophylactic devices rolled off from a holder;

air tube means operable for blasting rolled up prophylactic devices from said holder into said chute; and a collector located so as to receive prophylactic devices passing through said chute.

* * * * *